US009177081B2

(12) United States Patent
Venkataraman et al.

(10) Patent No.: US 9,177,081 B2
(45) Date of Patent: *Nov. 3, 2015

(54) METHOD AND SYSTEM FOR PROCESSING AMBIGUOUS, MULTI-TERM SEARCH QUERIES

(71) Applicant: Veveo, Inc., Andover, MA (US)

(72) Inventors: Sashikumar Venkataraman, Andover, MA (US); Rakesh Barve, Bangalore (IN); Pankaj Garg, Patiala (IN); Pranav Rajanala, Bangalore (IN); Murali Aravamudan, Windham, NH (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,690

(22) Filed: Apr. 1, 2013

(65) Prior Publication Data
US 2013/0254188 A1 Sep. 26, 2013

Related U.S. Application Data

(63) Continuation of application No. 12/869,991, filed on Aug. 27, 2010, now Pat. No. 8,433,696, which is a continuation of application No. 11/235,928, filed on Sep. 27, 2005, now Pat. No. 7,788,266.

(60) Provisional application No. 60/711,866, filed on Aug. 26, 2005, provisional application No. 60/716,101, filed on Sep. 12, 2005.

(51) Int. Cl.
*G06F 17/30* (2006.01)
(52) U.S. Cl.
CPC .... *G06F 17/30991* (2013.01); *G06F 17/30997* (2013.01)

(58) Field of Classification Search
CPC .................................................. G06F 17/30991
USPC .................................. 707/706, 723, 748, 752
See application file for complete search history.

(56) References Cited

U.S. PATENT DOCUMENTS 252,873 A 1/1882 Freese
1,261,167 A 4/1918 Russell
(Continued)

FOREIGN PATENT DOCUMENTS

AU 731010 B2 3/2001
AU 733993 B2 5/2001
(Continued)

OTHER PUBLICATIONS

Ardissono, L. et al., User Modeling and Recommendation Techniques for Personalized Electronic Program Guides, Personalized Digitial Television, Editors: Ardissono, et al., Kluwer Academic Press, 2004.
(Continued)

*Primary Examiner* — Apu Mofiz
*Assistant Examiner* — Cindy Nguyen
(74) *Attorney, Agent, or Firm* — Ropes & Gray LLP

(57) ABSTRACT

In accordance with one or more embodiments of the invention, a method and system are provided of processing a search query entered by a user of a device having a text input interface with overloaded keys. The search query is directed at identifying an item from a set of items. Each of the items has one or more associated descriptors. The system receives from the user an ambiguous search query directed at identifying a desired item. The search query is a prefix substring of each of at least two words relating to the desired item. The system dynamically identifies a group of one or more items from the set of items having one or more descriptors matching the search query as the user enters each character of the search query. The system outputs identification of the one or more items of the identified group to be displayed on the device operated by the user.

1 Claim, 9 Drawing Sheets

PRIOR ART

(56) References Cited

U.S. PATENT DOCUMENTS

| | | |
|---|---|---|
| 4,045,777 A | 8/1977 | Mierzwinski et al. |
| 4,453,217 A | 6/1984 | Boivie |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,760,528 A | 7/1988 | Levin |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,797,855 A | 1/1989 | Duncan, IV et al. |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,893,238 A | 1/1990 | Venema |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,001,116 A | 3/1991 | Folkman et al. |
| 5,008,810 A | 4/1991 | Kessel et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,148,154 A | 9/1992 | MacKay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,172,413 A | 12/1992 | Bradley et al. |
| 5,177,604 A | 1/1993 | Martinez |
| 5,179,654 A | 1/1993 | Richards et al. |
| 5,195,092 A | 3/1993 | Wilson et al. |
| 5,200,823 A | 4/1993 | Yoneda et al. |
| 5,204,897 A | 4/1993 | Wyman |
| 5,206,722 A | 4/1993 | Kwan |
| 5,210,075 A | 5/1993 | Scholz et al. |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,224,060 A | 6/1993 | Ma |
| 5,227,874 A | 7/1993 | Von Kohorn |
| 5,231,493 A | 7/1993 | Apitz |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,283,639 A | 2/1994 | Esch et al. |
| 5,283,819 A | 2/1994 | Glick et al. |
| 5,285,278 A | 2/1994 | Holman |
| 5,301,028 A | 4/1994 | Banker et al. |

(56) References Cited

U.S. PATENT DOCUMENTS

| | | |
|---|---|---|
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,337,347 A | 8/1994 | Halstead-Nussloch et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,369,605 A | 11/1994 | Parks |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,444,499 A | 8/1995 | Saitoh |
| 5,446,919 A | 8/1995 | Wilkins |
| 5,452,012 A | 9/1995 | Saitoh |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,479,892 A | 1/1996 | Edwards |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,487,616 A | 1/1996 | Ichbiah |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,557,338 A | 9/1996 | Maze et al. |
| 5,557,686 A | 9/1996 | Brown et al. |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,606,374 A | 2/1997 | Bertram |
| 5,610,653 A | 3/1997 | Abecassis |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,406 A | 4/1997 | Ichbiah |
| 5,623,613 A | 4/1997 | Rowe et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |

(56) References Cited

U.S. PATENT DOCUMENTS

| | | |
|---|---|---|
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick |
| 5,724,525 A | 3/1998 | Beyers, II et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li et al. |
| 5,737,028 A | 4/1998 | Bertram et al. |
| 5,737,030 A | 4/1998 | Hong et al. |
| 5,740,549 A | 4/1998 | Reilly et al. |
| 5,745,889 A | 4/1998 | Burrows |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,588 A | 6/1998 | Li |
| 5,774,887 A | 6/1998 | Wolff et al. |
| 5,778,182 A | 7/1998 | Cathey et al. |
| 5,781,226 A | 7/1998 | Sheehan |
| 5,781,245 A | 7/1998 | Van Der Weij et al. |
| 5,781,246 A | 7/1998 | Alten et al. |
| 5,784,258 A | 7/1998 | Quinn |
| 5,790,202 A | 8/1998 | Kummer et al. |
| 5,790,426 A | 8/1998 | Robinson |
| 5,793,438 A | 8/1998 | Bedard |
| 5,793,964 A | 8/1998 | Rogers et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,802,361 A | 9/1998 | Wang et al. |
| 5,805,154 A | 9/1998 | Brown |
| 5,805,155 A | 9/1998 | Allibhoy et al. |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,205 A | 9/1998 | Milnes et al. |
| 5,815,145 A | 9/1998 | Matthews, III |
| 5,815,671 A | 9/1998 | Morrison |
| 5,818,437 A | 10/1998 | Grover et al. |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,420 A | 10/1998 | Marshall et al. |
| 5,828,839 A | 10/1998 | Moncreiff |
| 5,828,945 A | 10/1998 | Klosterman |
| 5,828,991 A | 10/1998 | Skiena et al. |
| 5,830,068 A | 11/1998 | Brenner et al. |
| 5,835,087 A | 11/1998 | Herz et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,859,662 A | 1/1999 | Cragun et al. |
| 5,862,292 A | 1/1999 | Kubota et al. |
| 5,867,226 A | 2/1999 | Wehmeyer et al. |
| 5,867,227 A | 2/1999 | Yamaguchi |
| 5,872,588 A | 2/1999 | Aras et al. |
| 5,872,834 A | 2/1999 | Teitelbaum |
| 5,874,985 A | 2/1999 | Matthews, III |
| 5,875,108 A | 2/1999 | Hoffberg et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,892,498 A | 4/1999 | Marshall et al. |
| 5,892,535 A | 4/1999 | Allen et al. |
| 5,896,444 A | 4/1999 | Perlman et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,323 A | 5/1999 | Lawler et al. |
| 5,907,366 A | 5/1999 | Farmer et al. |
| 5,912,664 A | 6/1999 | Eick et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,929,849 A | 7/1999 | Kikinis |
| 5,929,850 A | 7/1999 | Broadwin et al. |
| 5,930,788 A | 7/1999 | Wical |
| 5,936,679 A | 8/1999 | Kasahara et al. |
| 5,937,422 A | 8/1999 | Nelson et al. |
| 5,940,073 A | 8/1999 | Klosterman et al. |
| 5,940,572 A | 8/1999 | Balaban et al. |
| 5,945,928 A | 8/1999 | Kushler et al. |
| 5,945,987 A | 8/1999 | Dunn |
| 5,945,988 A | 8/1999 | Williams et al. |
| 5,951,642 A | 9/1999 | Onoe et al. |
| 5,953,541 A | 9/1999 | King et al. |
| 5,956,541 A | 9/1999 | King et al. |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,999,912 A | 12/1999 | Wodarz et al. |
| 6,002,393 A | 12/1999 | Hite et al. |

(56) References Cited

U.S. PATENT DOCUMENTS

| | | |
|---|---|---|
| 6,002,394 A | 12/1999 | Schein et al. |
| 6,005,562 A | 12/1999 | Shiga et al. |
| 6,005,565 A | 12/1999 | Legall et al. |
| 6,005,597 A | 12/1999 | Barrett et al. |
| 6,006,225 A | 12/1999 | Bowman et al. |
| 6,006,257 A | 12/1999 | Slezak |
| 6,008,799 A | 12/1999 | Van Kleeck |
| 6,008,802 A | 12/1999 | Iki et al. |
| 6,009,459 A | 12/1999 | Belfiore et al. |
| 6,011,546 A | 1/2000 | Bertram |
| 6,011,554 A | 1/2000 | King et al. |
| 6,012,053 A | 1/2000 | Pant et al. |
| 6,014,137 A | 1/2000 | Burns |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,025,837 A | 2/2000 | Matthews, III et al. |
| 6,025,886 A | 2/2000 | Koda |
| 6,028,599 A | 2/2000 | Yuen et al. |
| 6,029,045 A | 2/2000 | Picco et al. |
| 6,029,195 A | 2/2000 | Herz |
| 6,035,304 A | 3/2000 | Machida et al. |
| 6,041,311 A | 3/2000 | Chislenko et al. |
| 6,047,300 A | 4/2000 | Walfish et al. |
| 6,047,317 A | 4/2000 | Bisdikian et al. |
| 6,049,333 A | 4/2000 | LaJoie et al. |
| 6,049,824 A | 4/2000 | Simonin |
| 6,052,145 A | 4/2000 | Macrae et al. |
| 6,061,060 A | 5/2000 | Berry et al. |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,072,460 A | 6/2000 | Marshall et al. |
| 6,075,526 A | 6/2000 | Rothmuller |
| 6,075,551 A | 6/2000 | Berezowski et al. |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,098,065 A | 8/2000 | Skillen et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,133,909 A | 10/2000 | Schein et al. |
| 6,141,003 A | 10/2000 | Chor et al. |
| 6,144,401 A | 11/2000 | Casement et al. |
| 6,147,714 A | 11/2000 | Terasawa et al. |
| 6,151,059 A | 11/2000 | Schein et al. |
| 6,154,203 A | 11/2000 | Yuen et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,169,542 B1 | 1/2001 | Hooks et al. |
| 6,169,984 B1 | 1/2001 | Bogdan |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,186,443 B1 | 2/2001 | Shaffer |
| 6,189,002 B1 | 2/2001 | Roitblat |
| 6,191,780 B1 | 2/2001 | Martin et al. |
| 6,202,212 B1 | 3/2001 | Sturgeon et al. |
| 6,204,848 B1 | 3/2001 | Nowlan et al. |
| 6,209,129 B1 | 3/2001 | Carr et al. |
| 6,209,130 B1 | 3/2001 | Rector, Jr. et al. |
| 6,216,264 B1 | 4/2001 | Maze et al. |
| 6,223,059 B1 | 4/2001 | Haestrup |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,260,050 B1 | 7/2001 | Yost et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,266,048 B1 | 7/2001 | Carau, Sr. |
| 6,266,814 B1 | 7/2001 | Lemmons et al. |
| 6,268,849 B1 | 7/2001 | Boyer et al. |
| 6,269,361 B1 | 7/2001 | Davis et al. |
| 6,275,268 B1 | 8/2001 | Ellis et al. |
| 6,279,157 B1 | 8/2001 | Takasu |
| 6,285,713 B1 | 9/2001 | Nakaya et al. |
| 6,286,064 B1 | 9/2001 | King et al. |
| 6,286,140 B1 | 9/2001 | Ivanyi |
| 6,289,346 B1 | 9/2001 | Milewski et al. |
| 6,292,804 B1 | 9/2001 | Ardoin et al. |
| 6,298,482 B1 | 10/2001 | Seidman et al. |
| 6,307,548 B1 | 10/2001 | Flinchem et al. |
| 6,307,549 B1 | 10/2001 | King et al. |
| 6,311,877 B1 | 11/2001 | Yang |
| 6,312,336 B1 | 11/2001 | Handelman et al. |
| 6,320,588 B1 | 11/2001 | Palmer et al. |
| 6,323,911 B1 | 11/2001 | Schein et al. |
| 6,331,877 B1 | 12/2001 | Bennington et al. |
| 6,341,195 B1 | 1/2002 | Mankovitz et al. |
| 6,342,926 B1 | 1/2002 | Hanafee et al. |
| 6,357,042 B2 | 3/2002 | Srinivasan et al. |
| 6,360,215 B1 | 3/2002 | Judd et al. |
| 6,363,525 B1 | 3/2002 | Dougherty et al. |
| 6,377,945 B1 | 4/2002 | Risvik |
| 6,381,582 B1 | 4/2002 | Walker et al. |
| 6,383,080 B1 | 5/2002 | Link et al. |
| 6,385,602 B1 | 5/2002 | Tso et al. |
| 6,388,714 B1 | 5/2002 | Schein et al. |
| 6,389,593 B1 | 5/2002 | Yamagishi |
| 6,392,640 B1 | 5/2002 | Will |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,438,579 B1 | 8/2002 | Hosken |
| 6,438,751 B1 | 8/2002 | Voyticky et al. |
| 6,446,261 B1 | 9/2002 | Rosser |
| 6,453,471 B1 | 9/2002 | Klosterman |
| 6,456,331 B2 | 9/2002 | Kwoh |
| 6,463,585 B1 | 10/2002 | Hendricks et al. |
| 6,463,586 B1 | 10/2002 | Jerding |
| 6,466,933 B1 | 10/2002 | Huang et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,498,895 B2 | 12/2002 | Young et al. |
| 6,505,348 B1 | 1/2003 | Knowles et al. |
| 6,515,680 B1 | 2/2003 | Hendricks et al. |
| 6,516,329 B1 | 2/2003 | Smith |
| 6,529,903 B2 | 3/2003 | Smith et al. |
| 6,539,548 B1 | 3/2003 | Hendricks et al. |
| 6,542,169 B1 | 4/2003 | Marshall et al. |
| 6,543,052 B1 | 4/2003 | Ogasawara |

(56) References Cited

U.S. PATENT DOCUMENTS

| | | |
|---|---|---|
| 6,546,556 B1 | 4/2003 | Kataoka et al. |
| 6,564,213 B1 | 5/2003 | Ortega et al. |
| 6,564,313 B1 | 5/2003 | Kashyap |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,594,657 B1 | 7/2003 | Livowsky |
| 6,600,364 B1 | 7/2003 | Liang et al. |
| 6,600,496 B1 | 7/2003 | Wagner et al. |
| 6,600,503 B2 | 7/2003 | Stautner et al. |
| 6,604,138 B1 | 8/2003 | Virine et al. |
| 6,606,128 B2 | 8/2003 | Hanafee et al. |
| 6,614,422 B1 | 9/2003 | Rafii et al. |
| 6,614,455 B1 | 9/2003 | Cuijpers et al. |
| 6,615,248 B1 | 9/2003 | Smith |
| 6,622,148 B1 | 9/2003 | Noble et al. |
| 6,622,306 B1 | 9/2003 | Kamada |
| 6,631,496 B1 | 10/2003 | Li et al. |
| 6,631,523 B1 | 10/2003 | Matthews, III et al. |
| 6,651,251 B1 | 11/2003 | Shoff et al. |
| 6,660,503 B2 | 12/2003 | Kierulff |
| 6,662,177 B1 | 12/2003 | Martino et al. |
| 6,664,980 B2 | 12/2003 | Bryan et al. |
| 6,665,869 B1 | 12/2003 | Ellis et al. |
| 6,687,906 B1 | 2/2004 | Yuen et al. |
| 6,698,020 B1 | 2/2004 | Zigmond et al. |
| 6,708,336 B1 | 3/2004 | Bruette |
| 6,721,954 B1 | 4/2004 | Nickum |
| 6,732,369 B1 | 5/2004 | Schein et al. |
| 6,734,881 B1 | 5/2004 | Will |
| 6,735,695 B1 | 5/2004 | Gopalakrishnan et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,760,537 B2 | 7/2004 | Mankovitz |
| 6,760,918 B2 | 7/2004 | Rodriguez et al. |
| 6,766,526 B1 | 7/2004 | Ellis |
| 6,772,147 B2 | 8/2004 | Wang |
| 6,785,671 B1 | 8/2004 | Bailey et al. |
| 6,799,326 B2 | 9/2004 | Boylan, III et al. |
| 6,801,909 B2 | 10/2004 | Delgado et al. |
| 6,828,993 B1 | 12/2004 | Hendricks et al. |
| 6,835,602 B2 | 12/2004 | Norskov et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith et al. |
| 6,865,746 B1 | 3/2005 | Herrington et al. |
| 6,868,551 B1 | 3/2005 | Lawler et al. |
| 6,907,273 B1 | 6/2005 | Smethers |
| 6,938,208 B2 | 8/2005 | Reichardt |
| 6,965,374 B2 | 11/2005 | Villet et al. |
| 6,973,669 B2 | 12/2005 | Daniels |
| 6,981,273 B1 | 12/2005 | Domegan et al. |
| 6,983,478 B1 | 1/2006 | Grauch et al. |
| 6,999,959 B1 | 2/2006 | Lawrence et al. |
| 7,003,792 B1 | 2/2006 | Yuen |
| 7,007,008 B2 | 2/2006 | Goel et al. |
| 7,013,304 B1 | 3/2006 | Schuetze et al. |
| 7,028,323 B2 | 4/2006 | Franken et al. |
| 7,028,326 B1 | 4/2006 | Westlake et al. |
| 7,069,576 B1 | 6/2006 | Knudson et al. |
| 7,089,236 B1 | 8/2006 | Stibel |
| 7,110,714 B1 | 9/2006 | Kay et al. |
| 7,117,207 B1 | 10/2006 | Kerschberg et al. |
| 7,130,866 B2 | 10/2006 | Schaffer |
| 7,136,845 B2 | 11/2006 | Chandrasekar et al. |
| 7,136,854 B2 | 11/2006 | Smith et al. |
| 7,146,627 B1 | 12/2006 | Ismail et al. |
| 7,149,983 B1 | 12/2006 | Robertson et al. |
| 7,174,512 B2 | 2/2007 | Martin et al. |
| 7,185,355 B1 | 2/2007 | Ellis et al. |
| 7,191,238 B2 | 3/2007 | Uchida |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,228,556 B2 | 6/2007 | Beach et al. |
| 7,228,856 B2 | 6/2007 | Aoyagi |
| 7,266,833 B2 | 9/2007 | Ward, III et al. |
| 7,269,548 B2 | 9/2007 | Fux et al. |
| 7,293,231 B1 | 11/2007 | Gunn et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,461,061 B2 | 12/2008 | Aravamudan et al. |
| 7,480,929 B2 | 1/2009 | Klosterman et al. |
| 7,487,151 B2 | 2/2009 | Yamamoto |
| 7,502,774 B2 | 3/2009 | Beavers et al. |
| 7,509,313 B2 | 3/2009 | Colledge et al. |
| 7,529,741 B2 | 5/2009 | Aravamudan et al. |
| 7,529,744 B1 | 5/2009 | Srivastava et al. |
| 7,536,384 B2 | 5/2009 | Venkataraman et al. |
| 7,536,854 B2 | 5/2009 | Da-Silva et al. |
| 7,539,676 B2 | 5/2009 | Aravamudan et al. |
| 7,548,915 B2 | 6/2009 | Ramer et al. |
| 7,562,069 B1 | 7/2009 | Chowdhury et al. |
| 7,594,244 B2 | 9/2009 | Scholl et al. |
| 7,644,054 B2 | 1/2010 | Garg et al. |
| 7,657,526 B2 | 2/2010 | Aravamudan et al. |
| 7,668,832 B2 | 2/2010 | Yeh et al. |
| 7,673,319 B1 | 3/2010 | Hendricks et al. |
| 7,679,534 B2 | 3/2010 | Kay et al. |
| 7,683,886 B2 | 3/2010 | Willey |
| 7,685,197 B2 | 3/2010 | Fain et al. |
| 7,712,053 B2 | 5/2010 | Bradford et al. |
| 7,725,485 B1 | 5/2010 | Sahami et al. |
| 7,725,486 B2 | 5/2010 | Tsuzuki et al. |
| 7,739,280 B2 | 6/2010 | Aravamudan et al. |
| 7,757,250 B1 | 7/2010 | Horvitz et al. |
| 7,774,294 B2 | 8/2010 | Aravamudan et al. |
| 7,774,341 B2 | 8/2010 | Aravamudan et al. |
| 7,779,011 B2 | 8/2010 | Venkataraman et al. |
| 7,788,266 B2 | 8/2010 | Venkataraman et al. |
| 7,792,815 B2 | 9/2010 | Aravamudan et al. |
| 7,835,998 B2 | 11/2010 | Aravamudan et al. |
| 7,885,963 B2 | 2/2011 | Sanders |
| 7,890,526 B1 | 2/2011 | Brewer et al. |
| 7,904,924 B1 | 3/2011 | de Heer et al. |
| 7,925,986 B2 | 4/2011 | Aravamudan |
| 7,974,962 B2 | 7/2011 | Krakirian et al. |
| 8,005,813 B2 | 8/2011 | Chowdhury et al. |
| 8,046,801 B2 | 10/2011 | Ellis et al. |
| 8,073,860 B2 | 12/2011 | Venkataraman et al. |
| 8,078,884 B2 | 12/2011 | Ramakrishnan et al. |
| 8,107,397 B1 | 1/2012 | Bagchi et al. |
| 8,433,696 B2 | 4/2013 | Venkataraman et al. |
| 8,732,152 B2 | 5/2014 | Krakirian et al. |
| 2001/0001160 A1 | 5/2001 | Shoff et al. |
| 2001/0029610 A1 | 10/2001 | Corvin et al. |
| 2001/0042246 A1 | 11/2001 | Yuen et al. |
| 2001/0044759 A1 | 11/2001 | Kutsumi et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0002550 A1 | 1/2002 | Berman |
| 2002/0023262 A1 | 2/2002 | Porter |
| 2002/0023263 A1 | 2/2002 | Ahn et al. |
| 2002/0042791 A1 | 4/2002 | Smith et al. |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049752 A1 | 4/2002 | Bowman et al. |
| 2002/0052873 A1 | 5/2002 | Delgado et al. |
| 2002/0059066 A1 | 5/2002 | O'Hagan |
| 2002/0059602 A1 | 5/2002 | Macrae et al. |
| 2002/0059621 A1 | 5/2002 | Thomas et al. |
| 2002/0073424 A1 | 6/2002 | Ward et al. |
| 2002/0077143 A1 | 6/2002 | Sharif et al. |
| 2002/0083439 A1 | 6/2002 | Eldering |
| 2002/0083448 A1 | 6/2002 | Johnson |

(56) References Cited

U.S. PATENT DOCUMENTS

| | | |
|---|---|---|
| 2002/0092017 A1 | 7/2002 | Klosterman et al. |
| 2002/0103798 A1 | 8/2002 | Abrol et al. |
| 2002/0116291 A1 | 8/2002 | Grasso et al. |
| 2002/0120925 A1 | 8/2002 | Logan |
| 2002/0120933 A1 | 8/2002 | Knudson et al. |
| 2002/0124249 A1 | 9/2002 | Shintani et al. |
| 2002/0129366 A1 | 9/2002 | Schein et al. |
| 2002/0133481 A1 | 9/2002 | Smith et al. |
| 2002/0144267 A1 | 10/2002 | Gutta et al. |
| 2002/0152190 A1 | 10/2002 | Biebesheimer et al. |
| 2002/0174430 A1 | 11/2002 | Ellis et al. |
| 2002/0184373 A1 | 12/2002 | Maes |
| 2002/0188488 A1 | 12/2002 | Hinkle |
| 2002/0196268 A1 | 12/2002 | Wolff et al. |
| 2002/0199192 A1 | 12/2002 | Donnelly |
| 2002/0199194 A1 | 12/2002 | Ali |
| 2003/0005432 A1 | 1/2003 | Ellis et al. |
| 2003/0005445 A1 | 1/2003 | Schein et al. |
| 2003/0005452 A1 | 1/2003 | Rodriguez |
| 2003/0005462 A1 | 1/2003 | Broadus et al. |
| 2003/0011573 A1 | 1/2003 | Villet et al. |
| 2003/0014399 A1 | 1/2003 | Hansen et al. |
| 2003/0014753 A1 | 1/2003 | Beach et al. |
| 2003/0023976 A1 | 1/2003 | Kamen et al. |
| 2003/0028884 A1 | 2/2003 | Swart et al. |
| 2003/0028889 A1 | 2/2003 | McCoskey et al. |
| 2003/0033292 A1 | 2/2003 | Meisel et al. |
| 2003/0037043 A1 | 2/2003 | Chang et al. |
| 2003/0037333 A1 | 2/2003 | Ghashghai et al. |
| 2003/0046698 A1 | 3/2003 | Kamen et al. |
| 2003/0051240 A1 | 3/2003 | Schaffer et al. |
| 2003/0066068 A1 | 4/2003 | Gutta et al. |
| 2003/0066079 A1 | 4/2003 | Suga |
| 2003/0067495 A1 | 4/2003 | Pu et al. |
| 2003/0079227 A1 | 4/2003 | Knowles et al. |
| 2003/0084270 A1 | 5/2003 | Coon et al. |
| 2003/0097661 A1 | 5/2003 | Li et al. |
| 2003/0103088 A1 | 6/2003 | Dresti et al. |
| 2003/0105637 A1 | 6/2003 | Rodriguez et al. |
| 2003/0110499 A1 | 6/2003 | Knudson et al. |
| 2003/0110507 A1 | 6/2003 | Dimitrova et al. |
| 2003/0117434 A1 | 6/2003 | Hugh |
| 2003/0135464 A1 | 7/2003 | Mourad et al. |
| 2003/0154138 A1 | 8/2003 | Phillips et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2003/0217121 A1 | 11/2003 | Willis |
| 2003/0226146 A1 | 12/2003 | Thurston et al. |
| 2003/0229900 A1 | 12/2003 | Reisman |
| 2003/0233656 A1 | 12/2003 | Sie et al. |
| 2003/0237096 A1 | 12/2003 | Barrett et al. |
| 2004/0003407 A1 | 1/2004 | Hanafee et al. |
| 2004/0008319 A1 | 1/2004 | Lai et al. |
| 2004/0010326 A1 | 1/2004 | Schuster |
| 2004/0013909 A1 | 1/2004 | Shimizu et al. |
| 2004/0021691 A1 | 2/2004 | Dostie et al. |
| 2004/0024777 A1 | 2/2004 | Schaffer |
| 2004/0031931 A1 | 2/2004 | Muller et al. |
| 2004/0034652 A1 | 2/2004 | Hofmann et al. |
| 2004/0044677 A1 | 3/2004 | Huper-Graff et al. |
| 2004/0046744 A1 | 3/2004 | Rafii et al. |
| 2004/0049783 A1 | 3/2004 | Lemmons et al. |
| 2004/0049787 A1 | 3/2004 | Maissel et al. |
| 2004/0054520 A1 | 3/2004 | Dehlinger et al. |
| 2004/0073432 A1 | 4/2004 | Stone |
| 2004/0073926 A1 | 4/2004 | Nakamura et al. |
| 2004/0078809 A1 | 4/2004 | Drazin |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0103024 A1 | 5/2004 | Patel et al. |
| 2004/0103439 A1 | 5/2004 | Macrae et al. |
| 2004/0111742 A1 | 6/2004 | Hendricks et al. |
| 2004/0111745 A1 | 6/2004 | Schein et al. |
| 2004/0117831 A1 | 6/2004 | Ellis et al. |
| 2004/0123319 A1 | 6/2004 | Kim |
| 2004/0128282 A1 | 7/2004 | Kleinberger et al. |
| 2004/0128686 A1 | 7/2004 | Boyer et al. |
| 2004/0139091 A1 | 7/2004 | Shin |
| 2004/0139465 A1 | 7/2004 | Matthews et al. |
| 2004/0143569 A1 | 7/2004 | Gross et al. |
| 2004/0155908 A1 | 8/2004 | Wagner |
| 2004/0163032 A1 | 8/2004 | Guo et al. |
| 2004/0168189 A1 | 8/2004 | Reynolds et al. |
| 2004/0175121 A1 | 9/2004 | Ellis et al. |
| 2004/0194131 A1 | 9/2004 | Ellis et al. |
| 2004/0194138 A1 | 9/2004 | Boylan et al. |
| 2004/0194141 A1 | 9/2004 | Sanders |
| 2004/0205065 A1 | 10/2004 | Petras et al. |
| 2004/0216156 A1 | 10/2004 | Wagner |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0254911 A1 | 12/2004 | Grasso et al. |
| 2004/0261021 A1 | 12/2004 | Mittal et al. |
| 2004/0261098 A1 | 12/2004 | Macrae et al. |
| 2004/0268250 A1 | 12/2004 | Danker et al. |
| 2005/0002781 A1 | 1/2005 | Tonks |
| 2005/0010949 A1 | 1/2005 | Ward et al. |
| 2005/0015366 A1 | 1/2005 | Carrasco et al. |
| 2005/0015804 A1 | 1/2005 | LaJoie et al. |
| 2005/0028218 A1 | 2/2005 | Blake |
| 2005/0033967 A1 | 2/2005 | Morino et al. |
| 2005/0038702 A1 | 2/2005 | Merriman et al. |
| 2005/0071874 A1 | 3/2005 | Elcock et al. |
| 2005/0079895 A1 | 4/2005 | Kalenius et al. |
| 2005/0084235 A1 | 4/2005 | Nakajima |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0097622 A1 | 5/2005 | Zigmond et al. |
| 2005/0105881 A1 | 5/2005 | Mankovitz |
| 2005/0125307 A1 | 6/2005 | Hunt et al. |
| 2005/0129199 A1 | 6/2005 | Abe |
| 2005/0155056 A1 | 7/2005 | Knee et al. |
| 2005/0157217 A1 | 7/2005 | Hendricks |
| 2005/0174333 A1 | 8/2005 | Robinson et al. |
| 2005/0187945 A1 | 8/2005 | Ehrich et al. |
| 2005/0192944 A1 | 9/2005 | Flinchem |
| 2005/0198668 A1 | 9/2005 | Yuen et al. |
| 2005/0204382 A1 | 9/2005 | Ellis |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0216936 A1 | 9/2005 | Knudson et al. |
| 2005/0223308 A1 | 10/2005 | Gunn et al. |
| 2005/0229214 A1 | 10/2005 | Young et al. |
| 2005/0235319 A1 | 10/2005 | Carpenter et al. |
| 2005/0240580 A1 | 10/2005 | Zamir et al. |
| 2005/0244138 A1 | 11/2005 | O'Connor et al. |
| 2005/0246311 A1 | 11/2005 | Whelan et al. |
| 2005/0246324 A1 | 11/2005 | Paalasmaa et al. |
| 2005/0256846 A1 | 11/2005 | Zigmond et al. |
| 2005/0267994 A1 | 12/2005 | Wong et al. |
| 2005/0278175 A1 | 12/2005 | Hyvonen |
| 2005/0283468 A1 | 12/2005 | Kamvar et al. |
| 2005/0283796 A1 | 12/2005 | Flickinger |
| 2006/0010477 A1 | 1/2006 | Yu |
| 2006/0010503 A1 | 1/2006 | Inoue et al. |
| 2006/0013487 A1 | 1/2006 | Longe et al. |
| 2006/0015906 A1 | 1/2006 | Boyer et al. |
| 2006/0020662 A1 | 1/2006 | Robinson |
| 2006/0026641 A1 | 2/2006 | Jule et al. |
| 2006/0036640 A1 | 2/2006 | Tateno et al. |
| 2006/0041843 A1 | 2/2006 | Billsus et al. |

(56) References Cited

U.S. PATENT DOCUMENTS

| | | |
|---|---|---|
| 2006/0044277 A1 | 3/2006 | Fux et al. |
| 2006/0053470 A1 | 3/2006 | Colter et al. |
| 2006/0059044 A1 | 3/2006 | Chan et al. |
| 2006/0069616 A1 | 3/2006 | Bau |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0090812 A1 | 5/2006 | Summerville |
| 2006/0095937 A1 | 5/2006 | Knudson et al. |
| 2006/0098899 A1 | 5/2006 | King et al. |
| 2006/0101499 A1 | 5/2006 | Aravamudan et al. |
| 2006/0101503 A1 | 5/2006 | Venkataraman |
| 2006/0101504 A1 | 5/2006 | Aravamudan et al. |
| 2006/0106782 A1 | 5/2006 | Blumenau et al. |
| 2006/0112162 A1 | 5/2006 | Marot et al. |
| 2006/0117019 A1 | 6/2006 | Sylthe et al. |
| 2006/0129530 A1 | 6/2006 | Beavers et al. |
| 2006/0136379 A1 | 6/2006 | Marino et al. |
| 2006/0155694 A1 | 7/2006 | Chowdhury et al. |
| 2006/0156233 A1 | 7/2006 | Nurmi |
| 2006/0161520 A1 | 7/2006 | Brewer et al. |
| 2006/0163337 A1 | 7/2006 | Unruh |
| 2006/0167676 A1 | 7/2006 | Plumb |
| 2006/0167859 A1 | 7/2006 | Verbeck Sibley et al. |
| 2006/0173818 A1 | 8/2006 | Berstis et al. |
| 2006/0176283 A1 | 8/2006 | Suraqui |
| 2006/0184960 A1 | 8/2006 | Horton et al. |
| 2006/0184989 A1 | 8/2006 | Slothouber |
| 2006/0190308 A1 | 8/2006 | Janssens et al. |
| 2006/0190436 A1 | 8/2006 | Richardson et al. |
| 2006/0190966 A1 | 8/2006 | McKissick et al. |
| 2006/0195435 A1 | 8/2006 | Laird-McConnell et al. |
| 2006/0206454 A1 | 9/2006 | Forstall et al. |
| 2006/0206815 A1 | 9/2006 | Pathiyal et al. |
| 2006/0242178 A1 | 10/2006 | Butterfield et al. |
| 2006/0242607 A1 | 10/2006 | Hudson |
| 2006/0248078 A1 | 11/2006 | Gross et al. |
| 2006/0248555 A1 | 11/2006 | Eldering |
| 2006/0256070 A1 | 11/2006 | Moosavi et al. |
| 2006/0256078 A1 | 11/2006 | Flinchem et al. |
| 2006/0259344 A1 | 11/2006 | Patel et al. |
| 2006/0259479 A1 | 11/2006 | Dai |
| 2006/0261021 A1 | 11/2006 | Stagnaro |
| 2006/0271552 A1 | 11/2006 | McChesney et al. |
| 2006/0274051 A1 | 12/2006 | Longe et al. |
| 2006/0282856 A1 | 12/2006 | Errico et al. |
| 2007/0005526 A1 | 1/2007 | Whitney et al. |
| 2007/0005563 A1 | 1/2007 | Aravamudan |
| 2007/0005576 A1 | 1/2007 | Cutrell et al. |
| 2007/0016476 A1 | 1/2007 | Hoffberg et al. |
| 2007/0016862 A1 | 1/2007 | Kuzmin |
| 2007/0016926 A1 | 1/2007 | Ward et al. |
| 2007/0027852 A1 | 2/2007 | Howard et al. |
| 2007/0027861 A1 | 2/2007 | Huentelman et al. |
| 2007/0027871 A1 | 2/2007 | Arbajian |
| 2007/0033613 A1 | 2/2007 | Ward et al. |
| 2007/0043750 A1 | 2/2007 | Dingle |
| 2007/0044122 A1 | 2/2007 | Scholl et al. |
| 2007/0050337 A1 | 3/2007 | Venkataraman et al. |
| 2007/0050348 A1 | 3/2007 | Aharoni et al. |
| 2007/0061244 A1 | 3/2007 | Ramer et al. |
| 2007/0061317 A1 | 3/2007 | Ramer et al. |
| 2007/0061321 A1 | 3/2007 | Venkataraman |
| 2007/0061753 A1 | 3/2007 | Ng et al. |
| 2007/0061754 A1 | 3/2007 | Ardhanari et al. |
| 2007/0067272 A1 | 3/2007 | Flynt et al. |
| 2007/0074131 A1 | 3/2007 | Assadollahi |
| 2007/0076862 A1 | 4/2007 | Chatterjee et al. |
| 2007/0079239 A1 | 4/2007 | Ghassabian |
| 2007/0088681 A1 | 4/2007 | Aravamudan et al. |
| 2007/0094024 A1 | 4/2007 | Kristensson et al. |
| 2007/0100650 A1 | 5/2007 | Ramer et al. |
| 2007/0130128 A1 | 6/2007 | Garg et al. |
| 2007/0143567 A1 | 6/2007 | Gorobets |
| 2007/0150606 A1 | 6/2007 | Flinchem et al. |
| 2007/0162934 A1 | 7/2007 | Roop et al. |
| 2007/0182595 A1 | 8/2007 | Ghasabian |
| 2007/0186240 A1 | 8/2007 | Ward et al. |
| 2007/0208718 A1 | 9/2007 | Javid et al. |
| 2007/0214126 A1 | 9/2007 | Kikinis |
| 2007/0219984 A1 | 9/2007 | Aravamudan et al. |
| 2007/0219985 A1 | 9/2007 | Aravamudan et al. |
| 2007/0239682 A1 | 10/2007 | Arellanes et al. |
| 2007/0240045 A1 | 10/2007 | Fux et al. |
| 2007/0242178 A1 | 10/2007 | Kawasaki et al. |
| 2007/0255693 A1 | 11/2007 | Ramaswamy et al. |
| 2007/0256070 A1 | 11/2007 | Bykov et al. |
| 2007/0260703 A1 | 11/2007 | Ardhanari et al. |
| 2007/0266021 A1 | 11/2007 | Aravamudan et al. |
| 2007/0266026 A1 | 11/2007 | Aravamudan et al. |
| 2007/0266406 A1 | 11/2007 | Aravamudan et al. |
| 2007/0271205 A1 | 11/2007 | Aravamudan et al. |
| 2007/0276773 A1 | 11/2007 | Aravamudan et al. |
| 2007/0276821 A1 | 11/2007 | Aravamudan et al. |
| 2007/0276859 A1 | 11/2007 | Aravamudan et al. |
| 2007/0288456 A1 | 12/2007 | Aravamudan et al. |
| 2007/0288457 A1 | 12/2007 | Aravamudan et al. |
| 2008/0021884 A1 | 1/2008 | Jones et al. |
| 2008/0065617 A1 | 3/2008 | Burke et al. |
| 2008/0071771 A1 | 3/2008 | Venkataraman et al. |
| 2008/0077577 A1 | 3/2008 | Byrne et al. |
| 2008/0086704 A1 | 4/2008 | Aravamudan |
| 2008/0109401 A1 | 5/2008 | Sareen et al. |
| 2008/0114743 A1 | 5/2008 | Venkataraman et al. |
| 2008/0127265 A1 | 5/2008 | Ward et al. |
| 2008/0127266 A1 | 5/2008 | Ward et al. |
| 2008/0172368 A1 | 7/2008 | Chowdhury et al. |
| 2008/0177717 A1 | 7/2008 | Kumar et al. |
| 2008/0178221 A1 | 7/2008 | Schein et al. |
| 2008/0184315 A1 | 7/2008 | Ellis et al. |
| 2008/0188213 A1 | 8/2008 | Mankovitz |
| 2008/0189744 A1 | 8/2008 | Schein et al. |
| 2008/0195601 A1 | 8/2008 | Ntoulas et al. |
| 2008/0209229 A1 | 8/2008 | Ramakrishnan et al. |
| 2008/0235725 A1 | 9/2008 | Hendricks |
| 2009/0077496 A1 | 3/2009 | Aravamudan et al. |
| 2009/0198688 A1 | 8/2009 | Venkataraman et al. |
| 2009/0217203 A1 | 8/2009 | Aravamudan et al. |
| 2009/0222444 A1 | 9/2009 | Chowdhury et al. |
| 2010/0030578 A1 | 2/2010 | Siddique et al. |
| 2010/0121845 A1 | 5/2010 | Aravamudan et al. |
| 2010/0153380 A1 | 6/2010 | Garg et al. |
| 2010/0241625 A1 | 9/2010 | Aravamudan et al. |
| 2010/0293160 A1 | 11/2010 | Aravamudan et al. |
| 2010/0325111 A1 | 12/2010 | Aravamudan et al. |
| 2011/0043652 A1 | 2/2011 | King et al. |
| 2011/0076994 A1 | 3/2011 | Kim et al. |
| 2011/0239250 A1 | 9/2011 | Krakirian et al. |

FOREIGN PATENT DOCUMENTS

| | | |
|---|---|---|
| CA | 1030505 A1 | 5/1978 |
| CA | 1187197 A1 | 5/1985 |
| CA | 1188811 A1 | 6/1985 |
| CA | 1196082 A1 | 10/1985 |
| CA | 1200911 A1 | 2/1986 |
| CA | 2151458 A1 | 6/1994 |
| CA | 2164608 A1 | 12/1994 |
| CA | 2297039 A1 | 1/1999 |
| CA | 2312326 A1 | 6/1999 |
| CA | 1555191 | 12/2004 |
| DE | 29 18 846 | 11/1980 |
| DE | 3246225 A1 | 6/1984 |
| DE | 3337204 | 4/1985 |
| DE | 36 21 263 A1 | 1/1988 |
| DE | 3909334 A1 | 9/1990 |
| DE | 4201031 A1 | 7/1993 |
| DE | 19 531 121 A1 | 2/1997 |
| DE | 19 740 079 A1 | 3/1999 |
| DE | 19 931 046 A1 | 1/2001 |
| EP | 181058 A1 | 5/1986 |
| EP | 0 239 884 A1 | 10/1987 |
| EP | 0396062 A2 | 11/1990 |
| EP | 0401930 A2 | 12/1990 |

(56) References Cited

FOREIGN PATENT DOCUMENTS

| | | |
|---|---|---|
| EP | 0408892 A1 | 1/1991 |
| EP | 0420123 A2 | 4/1991 |
| EP | 0424648 A2 | 5/1991 |
| EP | 0444496 | 9/1991 |
| EP | 0447968 A2 | 9/1991 |
| EP | 0532322 A2 | 3/1993 |
| EP | 0550911 A1 | 7/1993 |
| EP | 0 560 593 | 9/1993 |
| EP | 0 572 090 | 12/1993 |
| EP | 0 682 452 A2 | 11/1995 |
| EP | 0721253 A2 | 7/1996 |
| EP | 0725539 A2 | 8/1996 |
| EP | 0752767 A2 | 1/1997 |
| EP | 0753964 A1 | 1/1997 |
| EP | 0762751 A2 | 3/1997 |
| EP | 0772360 | 5/1997 |
| EP | 0774866 A2 | 5/1997 |
| EP | 0775417 A1 | 5/1997 |
| EP | 0784405 | 7/1997 |
| EP | 0805594 A2 | 11/1997 |
| EP | 0806112 | 11/1997 |
| EP | 0822718 | 2/1998 |
| EP | 0827340 A2 | 3/1998 |
| EP | 0834798 | 4/1998 |
| EP | 0848554 A2 | 6/1998 |
| EP | 0849948 | 6/1998 |
| EP | 0 854 645 | 7/1998 |
| EP | 0851681 | 7/1998 |
| EP | 0852442 A1 | 7/1998 |
| EP | 0854654 | 7/1998 |
| EP | 0880856 A1 | 12/1998 |
| EP | 0905985 A2 | 3/1999 |
| EP | 0924927 | 6/1999 |
| EP | 0935393 A2 | 8/1999 |
| EP | 0944253 A1 | 9/1999 |
| EP | 0963119 A1 | 12/1999 |
| EP | 0988876 A1 | 3/2000 |
| EP | 1050794 | 11/2000 |
| EP | 1095504 A2 | 5/2001 |
| EP | 1143691 | 10/2001 |
| EP | 1036466 | 3/2003 |
| EP | 1338967 | 8/2003 |
| EP | 1338976 A2 | 8/2003 |
| EP | 1 463 307 A2 | 9/2004 |
| EP | 1458193 A2 | 9/2004 |
| EP | 1463307 | 9/2004 |
| EP | 1622054 A1 | 2/2006 |
| EP | 1810120 A2 | 7/2007 |
| EP | 1955130 A2 | 8/2008 |
| EP | 2016513 A2 | 1/2009 |
| EP | 2062171 A2 | 5/2009 |
| FR | 2662895 A1 | 12/1991 |
| GB | 1 554 411 | 10/1979 |
| GB | 2034995 A | 6/1980 |
| GB | 2126002 A | 3/1984 |
| GB | 2185670 A | 7/1987 |
| GB | 2256546 A | 12/1992 |
| GB | 2264409 A | 8/1993 |
| GB | 2309134 A | 7/1997 |
| HK | 1035285 | 3/2005 |
| JP | 58137334 A | 8/1983 |
| JP | 58196738 A | 11/1983 |
| JP | 58210776 A | 12/1983 |
| JP | 59141878 A | 8/1984 |
| JP | 61050470 A | 3/1986 |
| JP | 61074476 A | 4/1986 |
| JP | 62-060370 | 3/1987 |
| JP | 62060384 A | 3/1987 |
| JP | 63234679 A | 9/1988 |
| JP | 01307944 A | 12/1989 |
| JP | 02048879 A | 2/1990 |
| JP | 03063990 A | 3/1991 |
| JP | 04227380 | 8/1992 |
| JP | 04-335395 A | 11/1992 |
| JP | 05-183826 | 7/1993 |
| JP | 05284437 A | 10/1993 |
| JP | 06021907 | 1/1994 |
| JP | 60-61935 A | 3/1994 |
| JP | 07020254 | 1/1995 |
| JP | 07-050259 | 2/1995 |
| JP | 07-076592 | 3/1995 |
| JP | 07123326 | 5/1995 |
| JP | 07147657 A | 6/1995 |
| JP | 07-288759 | 10/1995 |
| JP | 07-321748 | 12/1995 |
| JP | 08-32528 | 2/1996 |
| JP | 0832538 | 2/1996 |
| JP | 08125497 | 5/1996 |
| JP | 08251122 | 9/1996 |
| JP | 08275077 | 10/1996 |
| JP | 09-37168 | 2/1997 |
| JP | 09037151 A | 2/1997 |
| JP | 09037172 A | 2/1997 |
| JP | 09-102827 A | 4/1997 |
| JP | 10-143340 | 5/1998 |
| JP | 10-143349 | 5/1998 |
| JP | 2838892 | 10/1998 |
| JP | 10-512420 | 11/1998 |
| JP | 2001-213595 | 8/2001 |
| JP | 2001-1513595 | 8/2001 |
| JP | 2001-513595 | 9/2001 |
| JP | 2002108918 A | 4/2002 |
| JP | 2002-279969 | 9/2002 |
| JP | 20027884 | 11/2002 |
| JP | 2003-533139 | 11/2003 |
| JP | 2005520268 A | 7/2005 |
| JP | 2005216035 A | 8/2005 |
| JP | 2005338933 A | 12/2005 |
| JP | 2006024212 A | 1/2006 |
| JP | 4062577 | 3/2008 |
| JP | 2009534761 A | 9/2009 |
| JP | 2010-503931 A | 2/2010 |
| WO | WO-8601359 A1 | 2/1986 |
| WO | WO-8601902 A1 | 3/1986 |
| WO | WO-8703768 A1 | 6/1987 |
| WO | WO-8804057 A1 | 6/1988 |
| WO | WO-8804507 A1 | 6/1988 |
| WO | WO-8902682 A1 | 3/1989 |
| WO | WO-8903085 A1 | 4/1989 |
| WO | WO-8912370 A1 | 12/1989 |
| WO | WO-9001243 A1 | 2/1990 |
| WO | WO-9015507 A1 | 12/1990 |
| WO | WO-9100670 A1 | 1/1991 |
| WO | WO-9105436 A1 | 4/1991 |
| WO | WO-9118476 A1 | 11/1991 |
| WO | WO-9204801 A1 | 3/1992 |
| WO | WO-9304473 A2 | 3/1993 |
| WO | WO-9305452 A1 | 3/1993 |
| WO | WO-9311638 A1 | 6/1993 |
| WO | WO-9311639 A1 | 6/1993 |
| WO | WO-9311640 A1 | 6/1993 |
| WO | WO-9323957 A1 | 11/1993 |
| WO | WO-9413107 A1 | 6/1994 |
| WO | WO-9414281 A1 | 6/1994 |
| WO | WO-9414282 A1 | 6/1994 |
| WO | WO-9414283 A1 | 6/1994 |
| WO | WO-9414284 A1 | 6/1994 |
| WO | WO-9421085 A1 | 9/1994 |
| WO | WO-9423383 A1 | 10/1994 |
| WO | WO-9429811 A1 | 12/1994 |
| WO | WO-9501056 A1 | 1/1995 |
| WO | WO-9501057 A1 | 1/1995 |
| WO | WO-9501058 A1 | 1/1995 |
| WO | WO-9501059 A1 | 1/1995 |
| WO | WO-9506389 A1 | 3/1995 |
| WO | WO-9507003 A1 | 3/1995 |
| WO | WO-9510910 A1 | 4/1995 |
| WO | WO-9515649 A1 | 6/1995 |
| WO | WO-9515657 A1 | 6/1995 |
| WO | WO-9515658 A1 | 6/1995 |
| WO | WO-9516568 A1 | 6/1995 |
| WO | WO-9519092 A1 | 7/1995 |
| WO | WO-95/26608 A1 | 10/1995 |
| WO | WO-9528055 A1 | 10/1995 |

(56) References Cited

FOREIGN PATENT DOCUMENTS

| | | |
|---|---|---|
| WO | WO-9528799 A1 | 10/1995 |
| WO | WO-9530961 A1 | 11/1995 |
| WO | WO-9531069 A1 | 11/1995 |
| WO | WO-9532583 A1 | 11/1995 |
| WO | WO-9532585 A1 | 11/1995 |
| WO | WO-9607270 A1 | 3/1996 |
| WO | WO-9608109 A1 | 3/1996 |
| WO | WO-9608113 A1 | 3/1996 |
| WO | WO-9609721 | 3/1996 |
| WO | WO-9613932 A1 | 5/1996 |
| WO | WO-9613935 A1 | 5/1996 |
| WO | WO-9617467 A2 | 6/1996 |
| WO | WO-9617473 A1 | 6/1996 |
| WO | WO-9621990 A2 | 7/1996 |
| WO | WO-9626605 A1 | 8/1996 |
| WO | WO-9627270 A1 | 9/1996 |
| WO | WO-9631980 A1 | 10/1996 |
| WO | WO-9634467 A1 | 10/1996 |
| WO | WO-9634486 A1 | 10/1996 |
| WO | WO-9634491 A1 | 10/1996 |
| WO | WO-9638799 A1 | 12/1996 |
| WO | WO-9641471 A1 | 12/1996 |
| WO | WO-9641477 A1 | 12/1996 |
| WO | WO-9641478 A1 | 12/1996 |
| WO | WO-9702702 A2 | 1/1997 |
| WO | WO-9704595 A1 | 2/1997 |
| WO | WO-9707656 A2 | 3/1997 |
| WO | WO-9713368 A1 | 4/1997 |
| WO | WO-9717774 A1 | 5/1997 |
| WO | WO-9718675 A1 | 5/1997 |
| WO | WO-9726612 A2 | 7/1997 |
| WO | WO-9731480 A1 | 8/1997 |
| WO | WO-97/42763 A1 | 11/1997 |
| WO | WO-9741673 A2 | 11/1997 |
| WO | WO-97/48230 A1 | 12/1997 |
| WO | WO-97/49237 A1 | 12/1997 |
| WO | WO-9749241 A1 | 12/1997 |
| WO | WO-9749242 A1 | 12/1997 |
| WO | WO-98/06219 A1 | 2/1998 |
| WO | WO-98/10589 A1 | 3/1998 |
| WO | WO-98/17064 A1 | 4/1998 |
| WO | WO-9816062 A1 | 4/1998 |
| WO | WO-9820675 A1 | 5/1998 |
| WO | WO-98/26584 A1 | 6/1998 |
| WO | WO-9826569 A2 | 6/1998 |
| WO | WO-9827723 A1 | 6/1998 |
| WO | WO-9828906 A2 | 7/1998 |
| WO | WO-9831148 A1 | 7/1998 |
| WO | WO-9841020 A1 | 9/1998 |
| WO | WO-98/47279 A2 | 10/1998 |
| WO | WO-98/48566 A2 | 10/1998 |
| WO | WO-9843183 A1 | 10/1998 |
| WO | WO-98/06173 A1 | 12/1998 |
| WO | WO-9856172 A1 | 12/1998 |
| WO | WO-99/04561 A1 | 1/1999 |
| WO | WO-9901984 A1 | 1/1999 |
| WO | WO-9907142 A1 | 2/1999 |
| WO | WO-9914947 | 3/1999 |
| WO | WO-9918722 | 4/1999 |
| WO | WO-9929109 A1 | 6/1999 |
| WO | WO-9930491 A1 | 6/1999 |
| WO | WO-9931480 A1 | 6/1999 |
| WO | WO-99/45700 A1 | 9/1999 |
| WO | WO-9945701 A1 | 9/1999 |
| WO | WO-9945702 A1 | 9/1999 |
| WO | WO-9952285 A1 | 10/1999 |
| WO | WO-9956466 A1 | 10/1999 |
| WO | WO-99/56473 A1 | 11/1999 |
| WO | WO-9960783 A1 | 11/1999 |
| WO | WO-9960789 A1 | 11/1999 |
| WO | WO-00/04708 A1 | 1/2000 |
| WO | WO-0004706 A2 | 1/2000 |
| WO | WO-0004708 A1 | 1/2000 |
| WO | WO-0005889 A1 | 2/2000 |
| WO | WO-00/11865 A1 | 3/2000 |
| WO | WO-00/13415 A2 | 3/2000 |
| WO | WO-00/16548 | 3/2000 |
| WO | WO-0011865 A1 | 3/2000 |
| WO | WO-0013415 A2 | 3/2000 |
| WO | WO-0016548 A1 | 3/2000 |
| WO | WO-00/28734 | 5/2000 |
| WO | WO-0027122 A1 | 5/2000 |
| WO | WO-0028734 A1 | 5/2000 |
| WO | WO-00/33560 A2 | 6/2000 |
| WO | WO-00/33573 A1 | 6/2000 |
| WO | WO-0033160 A2 | 6/2000 |
| WO | WO-0033224 A1 | 6/2000 |
| WO | WO-0033560 A2 | 6/2000 |
| WO | WO-0033573 A1 | 6/2000 |
| WO | WO-00/49801 A1 | 8/2000 |
| WO | WO-0049801 A1 | 8/2000 |
| WO | WO-00/04706 A2 | 11/2000 |
| WO | WO 00/70505 | 11/2000 |
| WO | WO-0070505 A1 | 11/2000 |
| WO | WO-00/79798 | 12/2000 |
| WO | WO-0079798 A1 | 12/2000 |
| WO | WO-01/01677 A1 | 1/2001 |
| WO | WO-01/06784 A2 | 1/2001 |
| WO | WO-0101677 A1 | 1/2001 |
| WO | WO-0106784 A2 | 1/2001 |
| WO | WO-01/15438 A1 | 3/2001 |
| WO | WO-0115438 A1 | 3/2001 |
| WO | WO-01/35662 A1 | 5/2001 |
| WO | WO-0135662 A1 | 5/2001 |
| WO | WO-0169213 A1 | 11/2001 |
| WO | WO-0189213 A1 | 11/2001 |
| WO | WO-0203227 A2 | 1/2002 |
| WO | WO-0209227 | 1/2002 |
| WO | WO-02/31731 A2 | 4/2002 |
| WO | WO-0231731 A2 | 4/2002 |
| WO | WO-02/084992 A2 | 10/2002 |
| WO | WO-02084992 A2 | 10/2002 |
| WO | WO 2004/010326 | 1/2004 |
| WO | WO-2004010326 A1 | 1/2004 |
| WO | WO 2004/031931 | 4/2004 |
| WO | WO-2004031931 A1 | 4/2004 |
| WO | WO 2005/033967 A2 | 4/2005 |
| WO | WO-2005033967 A2 | 4/2005 |
| WO | WO-2005073862 A2 | 4/2005 |
| WO | WO-2005054982 | 6/2005 |
| WO | WO-2005073862 A1 | 8/2005 |
| WO | WO 2005/084235 A2 | 9/2005 |
| WO | WO-2005084235 A2 | 9/2005 |
| WO | WO-2006/052966 A2 | 5/2006 |
| WO | WO-2006052959 A2 | 5/2006 |
| WO | WO-2007/025148 A2 | 3/2007 |
| WO | WO-2007/025149 A2 | 3/2007 |
| WO | WO-2007/062035 A2 | 5/2007 |
| WO | WO-2007/118038 A2 | 10/2007 |
| WO | WO-2007/124429 A2 | 11/2007 |
| WO | WO-2007124436 A2 | 11/2007 |
| WO | WO-2007131058 A2 | 11/2007 |
| WO | WO-2008034057 A2 | 3/2008 |
| WO | WO-2008091941 A2 | 7/2008 |
| WO | WO-2008063987 | 8/2008 |
| WO | WO-2008148012 A1 | 12/2008 |
| WO | WO-9627982 A1 | 11/2009 |

OTHER PUBLICATIONS

Dalianis, Improving Search Engine Retrieval Using a Compound Splitter for Swedish, Abstract of Presentation at NODALIDA 2005—15th Nordic Conference on Computational Linguistics, Joensuu Finland, May 21-22, 2005. Retrieved Jan. 5, 2006 from http://phon.joensuu.fi/nodalida/abstracts/03.shtml.
Digital Video Broadcasting, http://www.dvb.org (Oct. 12, 2007).
Flinchem, E., U.S. Appl. No. 60/548,589, filed Sep. 1, 2005.
Gadd T.N., Phonix: The Algorithm, Program 24(4), Oct. 1990, pp. 363-369.
Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

(56) References Cited

OTHER PUBLICATIONS

International Search Report, International Application No. PCT/US06/25249, mailed Jan. 29, 2008 (2 pages).
International Search Report, International Application No. PCT/US06/33204, mailed Sep. 21, 2007 (2 pages).
International Search Report, International Application No. PCT/US06/33257, mailed Mar. 26, 2008 (2 pages).
International Search Report, International Application No. PCT/US06/33258, mailed Mar. 26, 2008 (2 pages).
International Search Report, International Application No. PCT/US06/40005, mailed Jul. 3, 2007 (4 pages).
International Search Report, International Application No. PCT/US07/65703, mailed Jan. 25, 2008 (2 pages).
International Search Report, International Application No. PCT/US07/67100, mailed Mar. 7, 2008 (2 pages).
Kurapati, et al., "A Multi-Agent TV Recommender," In Proceedings of the UM 2001 Workshop "Personalization in Future TV," 2001, 8 pages.
Mackenzie, et al., Letterwise: Prefix-Based Disambiguation for Mobile Text input, Proceedings of the ACM Symposium on User Interface Software and Technology—UIST 2001, pp. 111-120.
Matthom, "Text Highlighting in Search Results", Jul. 22, 2005. Available at www.matthom.com/archive/2005/07/22/text-highlighting-in-search-results-; retrieved Jun. 23, 2006. (4 pages).
Mokotoff, Soundexing and Genealogy, Available at http://www.avotaynu.com/soundex.html, retrieved May 19, 2008, last updated Sep. 8, 2007 (6 pages).
Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251>.
Press Release From TEGIC Communications, TEGIC Communications Is Awarded Patent for Japanese T9(R) Text Input Software From the Japan Patent Office, Oct. 12, 2004, Retrieved Nov. 18, 2005 From http://www.tegic.com/press.sub.--view.html?release.sub.--num=55254242.
Review of Personalization Technologies: Collaborative Filtering vs. ChoiceStream's Attributized Bayesian Choice Modeling, Technology Brief, ChoiceStream Technologies, Cambridge, MA.
Roe, David et al., "Mapping UML Models Incorporating OCL Constraints into Object-Z", Technical Report, Sep. 2003, Department of Computing, Imperial College London (17 pages).
Silfverberg et al., Predicting Text Entry Speed on Mobile Phones, Proceedings of the ACM Conference on Human Factors in Computing Systems—CHI 2000, pp. 9-16
Supplemental European Search Report for 05826114.0 dated Aug. 20, 2009, 13 pages.
Supplemental European Search Report for 05826129.8 dated Aug. 11, 2009, 15 pages.
Supplemental European Search Report for 06838179.7 dated Dec. 9, 2009, 7 pages.
Supplemental European Search Report for 07761026.9 dated Jan. 28, 2010, 8 pages.
Supplementary European Search Report for PCT/US2005/040415 dated Aug. 11, 2009, 15 pages.
Supplementary European Search Report for PCT/US2005/040424 dated Aug. 20, 2009, 13 pages.
Talbot, David, "Soul of a New Mobile Machine." Technology Review: The Design Issue May/Jun. 2007. (pp. 46-53).
Turski, et al., "Inner Circle—People Centered Email Client," CHI 2005 Conference on Human Factors in Computing Systems, Apr. 2005, pp. 1845-1848, 4 pages, retrieved from URL:http://portal.acm.org/citation.cfm?id+1056808.1057037.
Wikipedia's entry for Levenshtein distance (n.d.), Retrieved Nov. 15, 2006 from http://en.wikipedia.org/wiki/Levenshtein.sub.--distance.
Written Opinion of the International Searching Authority, International Application No. PCT/US06/25249, mailed Jan. 29, 2008.
Written Opinion of the International Searching Authority, International Application No. PCT/US06/33204, mailed Sep. 21, 2007 (3 pages).
Written Opinion of the International Searching Authority, International Application No. PCT/US06/33257, mailed Mar. 26, 2008 (4 pages).
Written Opinion of the International Searching Authority, International Application No. PCT/US06/33258, mailed Mar. 26, 2008 (4 pages).
Written Opinion of the International Searching Authority, International Application No. PCT/US06/40005, mailed Jul. 3, 2007 (4 pages).
Written Opinion of the International Searching Authority, International Application No. PCT/US07/65703, mailed Jan. 25, 2008 (4 pages).
Written Opinion of the International Searching Authority, International Application No. PCT/US07/67100, mailed Mar. 7, 2008 (3 pages).
Complaint in *Veveo, Inc. v. Verizon Services Corp., Verizon Communications Inc., and Verizon Data Services India Pvt. Ltd.*, U.S. District Court Southern District of New York, Civil Action No. 10-CIV-6709 (JFK), filed Sep. 9, 2010, pp. 1-14.
Verizon's Answer to First Amended Complaint and Counterclaims in *Veveo, Inc. v. Verizon Services Corp., Verizon Communications Inc., and Verizon Data Services LLC*, U.S. District Court Southern District of New York, Civil Action No. 10-CIV-6709 (JFK), filed Dec. 9, 2010, pp. 1-17.
Veveo's Opening Claim Construction Memorandum in *Veveo, Inc. v. Verizon Services Corp. et al.*, U.S. District Court Southern District of New York, Civil Action No. 10-CIV-6709 (JFK-DCF), filed Jan. 12, 2012, 53 pages.
Verizon's Opening Claim Construction Brief in *Veveo, Inc. v. Verizon Services Corp. et al.*, U.S. District Court Southern District of New York, Civil Action No. 10-CIV-6709 (JFK-DCF), filed Jan. 12, 2012, 41 pages.
Verizon's Reply Claim Construction Brief in *Veveo, Inc. v. Verizon Services Corp. et al.*, U.S. District Court Southern District of New York, Civil Action No. 10-CIV-6709 (JFK-DCF), filed Jan. 12, 2012, 22 pages.
Veveo's Replay Claim Construction Memorandum in *Veveo, Inc. v. Verizon Services Corp. et al.*, U.S. District Court Southern District of New York, Civil Action No. 10-CIV-6709 (JFK-DCF), filed Jan. 12, 2012, 20 pages.
Zimmerman, et al., "TV Personalization System Design of a TV Show Recommender Engine and Interface," In Liiana Adrissono, Alfred Kosba, Mark Maybury (eds) Personalized Digital Television: Targeting Programs to Individual Viewers, Kluwer, 29 pages.
United States Office Action dated Jan. 26, 2015 for U.S. Appl. No. 13/570,976.
"Addressable Converters: A New Development at CableData," Via Cable, vol. 1, No. 12, Dec. 1981 (11 pages).
"Bell Atlantic Buys Cable TV Company for $22bn." Financial Times (London). Oct. 14, 1993 p. 65.
"Cable Television Equipment," Jerroid Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986 (326 pages).
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
"Dial M for Movie", Funkschau 11/94 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999) (33 pages).
"*Duck Tales*, (1987) [*TV Series 1987-1990*], "Internet Movie Database(*IMDB*) [*Retrieved on Apr. 7, 2007*].
"Enhanced Content Specification," "ATVEF," from the Internet at http://www.atvef.com/library/spec.html, printed Aug. 22, 2001, the document bears a Copyright date of 1998, 1999, 2000 (41 pages).
"European Telecommunications Standards: Digital Broadcasting Systems For Television Sound and Data Services: Specification for

(56) References Cited

OTHER PUBLICATIONS

Service Information (SI) in Digital Video Broadcasting (DVB) Systems," European Telecommunications Standards Institute, Dec. 1994 (64 pages).
"Facsimile Transmission," NHK Research Monthly Report. Dec. 1987 (Unknown author) (78 pages).
"Getting Started" Installation Guide, "Using Starsight 1" Manual, and Remote Control "Quick Reference Guide." (93 pages).
"Interactive Computer Conference Server," IBM Technical Bulletin, vol. 34, No. 7A, Dec. 1991, pp. 375-377.
"Interactive Device for Conventional TVs to Improve Functionality," IBM Technical Disclosure Bulletin, vol. 36, No. 7, Jul. 1993, pp. 53-54.
James Sorce, David Fay, Brian Raila and Robert Virzi, "Designing a Broadband Residential Entertainment Service: A Case Study," GTE Laboratories Incorporated, undated, pp. 141-148.
"Lists>What's On Tonite! TV Listings (fwd)," Internet article (On line), Jan. 28, 1995, XP 002378869 [Retrieved on Apr. 28, 2006].
"MSI Databasing Systems," TV Communications Journal, Jan. 1973.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the Internet at http://www.opentv.com/new/prevuefinal.htm, printed on Jun. 28, 1999 (2 pages).
"Probe XL Brochure, Auto Tote Systems, Inc.," (Newark, Delaware) (undated) 57 pgs.
"Prodigy Launches Interactive TV Listing", Apr. 22, 1994 public Broadcasting Report.
"Review of Personalization Technologies: Collaborative Filtering vs. ChoiceStream's Attributized Bayesian Choice Modeling," Technology Brief, ChoiceStream Technologies, Cambridge, MA (13 pages).
"Rewind, reply and unwind with new high-tech TV devices," by Lawrence J. Magid, LA Times. This document was printed from the internet on Jun. 6, 1999 and bears a date of May 19, 1999 (4 pages).
Technological Examination & Basic Investigative Research Report on Image Databases, Japan Mechanical Engineering Organization Int'l Society for the Advancement of Image Software. Japan, Mar. 1988.
"Technology: Turn on, tune in and print out—An experimental interactive television service is set to alter our viewing habits," Financial Times (London), Oct. 14, 1993, p. 11.
"The New Media and Broadcast Policy: An Investigation & Research Conference Report on Broadcasting Diversification." Radio Regulatory Bureau, Japan Ministry of Posts & Telecommunications, Mar. 1982 (114 pages).
"TV Listings Functional Spec.," Time Video Information Services, Inc., Starsight CB 1500 Customer Letter, 1994.
"Using StarSight 2," Instruction Manual, StarSight Telecast, Inc., Starsight CB 1500 Customer Letter, 1994.
"Windows 98 Feature Combines TV, Terminal and the Internet," New York Times, Aug. 18, 1998.
A Model of a Trust-Based Recommendation System on a Social Network—Published Date: Oct. 18, 2007.
C. de Kerchove and P. Dooren. The PageTrust Algorithm: how to rank web pages when negative links are allowed? In Proc. SIAM Int. Conf. on Data Mining, pp. 346352, 2008.
Computing and Applying Trust in Web-Based Social Networks—Published Date: Apr. 11, 2005 http://test.lib.umd.edu/drum/bitstream/1903/2384/1/umi-umd-2244.pdf.
European Search Report for 06838179.7 dated Dec. 9, 2009, 7 pages.
First Amended Complaint in *Veveo, Inc.* v. *Verizon Services Corp., Verizon Communications Inc.*, and *Verizon Data Services LLC*, U.S. District Court Southern District of New York, Civil Action No. 10-CIV-6709 (JFK), filed Nov. 16, 2010, 16 pages.
Good, N. et al., "Combining Collaborative Filtering with Personal Agents for Better Recommendations," Proc. 16th Natl. Conf. on Artificial Intelligence, Orlando, Florida, Jul. 18-22, 1999, pp. 439-446.
Guha, R., et al, "Propagation of Trust and Distrust", WWW2004, May 17-22, 2004, pp. 403-412.
International Search Report and Written Opinion for PCT/US06/25249 dated Jan. 29, 2008.
International Search Report and Written Opinion for PCT/US06/33204 dated Sep. 21, 2007.
International Search Report and Written Opinion for PCT/US06/40005 dated Jul. 3, 2007.
International Search Report and Written Opinion for PCT/US2005/040415 dated Nov. 27, 2006.
International Search Report and Written Opinion for PCT/US2005/040424 dated Nov. 21, 2006.
International Search Report and Written Opinion for PCT/US2005/040517 dated Jun. 13, 2008.
International Search Report and Written Opinion for PCT/US2006/030073 dated Jul. 7, 2008.
International Search Report and Written Opinion for PCT/US2006/033257 dated Mar. 26, 2008.
International Search Report and Written Opinion for PCT/US2006/033258 dated Mar. 26, 2008.
International Search Report and Written Opinion for PCT/US2006/045053 dated Jul. 24, 2008.
International Search Report and Written Opinion for PCT/US2007/065703 dated Jan. 25, 2008.
International Search Report and Written Opinion for PCT/US2007/067100 dated Mar. 7, 2008.
International Search Report and Written Opinion for PCT/US2007/067114 dated Jul. 2, 2008.
International Search Report and Written Opinion for PCT/US2007/068064 dated Jul. 7, 2008.
International Search Report and Written Opinion for PCT/US2007/078490 dated Jul. 3, 2008.
International Search Report and Written Opinion for PCT/US2007/084500 dated May 20, 2008.
International Search Report and Written Opinion for PCT/US2008/051789 dated Jul. 14, 2008.
International Search Report and Written Opinion for PCT/US2008/064730 dated Sep. 8, 2008.
International Search Report and Written Opinion for PCT/US2012/034780 dated Jul. 16, 2012.
International Search Report dated May 28, 2008, Application No. PCT/US2008/0011646 (4 pages) (now WO 2009/070193).
United States for U.S. Appl. No. 14/175,189 dated Sep. 8, 2014.
United States Office Action for U.S. Appl. No. 14/244,268 dated Feb. 3, 2015.
United States Office Action for U.S. Appl. No. 13/398,904 dated Jul. 8, 2014.
United States Office Action for U.S. Appl. No. 14/160,899 dated Sep. 22, 2014.
United States Office Action for U.S. Appl. No. 13/006,846 dated May 7, 2014.

802

| |
|---|
| The Koala Brothers: Archie's Loose Tooth; Pe |
| The Koala Brothers: George's Day Off; Archie |
| The Koala Brothers: Alice Rides Again; Ned |
| Charlie and Lola: I'm Not Feeling Well |
| Rockos Modern Life: Junk Junkies; Day of the |
| Rockos Modern Life: Born to Spawn; Uniform |
| Charlie and Lola: It's My Book |

INPUT TERM: 5 (J)

| |
|---|
| The Koala Brothers: Archie's Loose Tooth; Pe |
| The Koala Brothers: George's Day Off; Archie |
| Rockos Modern Life: Born to Spawn; Uniform |
| The New Adventures of Winnie the Pooh; Ee |
| Charlie and Lola: My Wobbly Tooth |
| Charlie and Lola: The Most Wonderfullest Pic |
| Lizzie McGuire: Educating Ethan |

INPUT TERM: 5 86 (J TO)

FIG. 8B

METHOD AND SYSTEM FOR PROCESSING AMBIGUOUS, MULTI-TERM SEARCH QUERIES

RELATED APPLICATIONS

The present application claims the benefit under 35 U.S.C. §120 as a continuation of U.S. patent application Ser. No. 12/869,991, filed on Aug. 27, 2010, and entitled "METHOD AND SYSTEM FOR PROCESSING AMBIGUOUS, MULTITERM SEARCH QUERIES," which is a continuation of U.S. patent application Ser. No. 11/235,928, entitled Method And System For Processing Ambiguous, Multi-Term Search Queries, filed Sep. 27, 2005, now U.S. Pat. No. 7,788,266, which claims the benefit under 35 U.S.C. §119(e) of U.S. Provisional Patent Application Ser. No. 60/716,101, filed Sep. 12, 2005, and entitled Method And System For Incremental Search With Reduced Text Entry Using A Reduced Keypad With Overloaded Keys, and U.S. Patent Application No. 60/711,866, filed Aug. 26, 2005, and entitled A Dynamic Highlighting Interface of Multi Word Prefixes of Results Obtained by Incremental Search with Reduced Text Entry on Television and Mobile Devices Using a Keypad with Overloaded Keys. U.S. patent application Ser. No. 12/869,991, U.S. patent application Ser. No. 11/235,928, U.S. Pat. No. 7,788,266 and U.S. Provisional Patent Application Ser. No. 60/716,101 are incorporated by reference herein in their entireties.

BACKGROUND OF THE INVENTION

1. Field of Invention

The present invention generally relates to processing search queries and, more particularly, to methods and systems for processing ambiguous, reduced text, multi-term search queries.

2. Description of Related Art

There are many user-operated devices such as mobile phones, PDAs (personal digital assistants), and television remote control devices that have small keypads, which a user can use for text entry. In many of these devices, largely because of device size restrictions, the keypad is small and has only a small number of keys, which are overloaded with alpha-numeric characters. Text input using these keypads is cumbersome.

FIG. 1 illustrates a common twelve-key keypad interface found in many cell phones and other mobile devices, and also increasingly in television remote control devices. The keypad 10 includes twelve keys 12, most of which are overloaded with multiple alpha-numeric characters or functions. The same key can be used to enter different characters. For instance, the "2" key can be used to enter the number "2" and the letters "A", "B" and "C". Text entry using such a keypad with overloaded keys can result in an ambiguous text entry, which requires some type of a disambiguation action. For instance, with a multi-press interface, a user can press a particular key multiple times in quick succession to select a desired character (e.g., to choose "B", the user would press the "2" key twice quickly, and to choose "C", the user would press the key three times). Alternatively, text entry can be performed using T9 and other text input mechanisms that provide vocabulary based completion choices for each word entered. Neither of these methods is however particularly useful for performing searches because of the number of steps needed to get to the result. One deficiency of the multi-press interface is that too many key strokes are needed. A drawback of applying a vocabulary based word completion interface is the need for the additional step of making a choice from a list of all possible word matches generated by the ambiguous text input. Furthermore vocabulary based word disambiguation systems are designed typically for composition applications (as opposed to search applications) where user explicitly disambiguates each word by performing a word completion action to resolve that word before proceeding to the next word in the composition.

BRIEF SUMMARY OF EMBODIMENTS OF THE INVENTION

In accordance with one or more embodiments of the invention, a method and system are provided of processing a search query entered by a user of a device having a text input interface with overloaded keys. The search query is directed at identifying an item from a set of items. Each of the items has one or more associated descriptors. The system receives from the user an ambiguous search query directed at identifying a desired item. The search query comprises a prefix substring of each of at least two words relating to the desired item. The system dynamically identifies a group of one or more items from the set of items having one or more descriptors matching the search query as the user enters each character of the search query. The system outputs identification of the one or more items of the identified group to be displayed on the device operated by the user.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a more complete understanding of various embodiments of the present invention, reference is now made to the following descriptions taken in connection with the accompanying drawings in which:

FIGS. 8A to 8C illustrate the incremental results retrieved when a user enters characters in a search query in accordance with one or more embodiments of the invention.

Like reference numerals generally refer to like elements in the drawings.

DETAILED DESCRIPTION OF EMBODIMENTS OF THE INVENTION

Briefly, methods and systems are provided in accordance with various embodiments of the invention for performing searches using ambiguous text input from devices having limited text input interfaces.

As described in further detail below, in accordance with various embodiments of the invention, methods and systems are provided for processing a search query entered by a user of a device having a text input interface with overloaded keys. The search query is directed at identifying an item from a set of items. Each of the items has one or more associated descriptors. The descriptors can include words in the name of the item or other information relating to the item. For example, in a television application, the item can be a television content item such as a movie, and the descriptors can be information on the title of the movie, the cast, directors, and other keywords and descriptions of the movie.

Using the text input interface, the user can enter an ambiguous search query directed at identifying a desired item. The search query comprises a prefix substring of each of at least two words relating to the desired item. A prefix substring of a word is a variable length string of characters that contains fewer than all the characters making up the word.

The system dynamically identifies a group of one or more items from the set of items having one or more descriptors matching the search query as the user enters each character of the search query. The group of the one or more items is displayed on the device operated by the user. The items are preferably displayed in an order of expected interest to the user.

Figure 1:
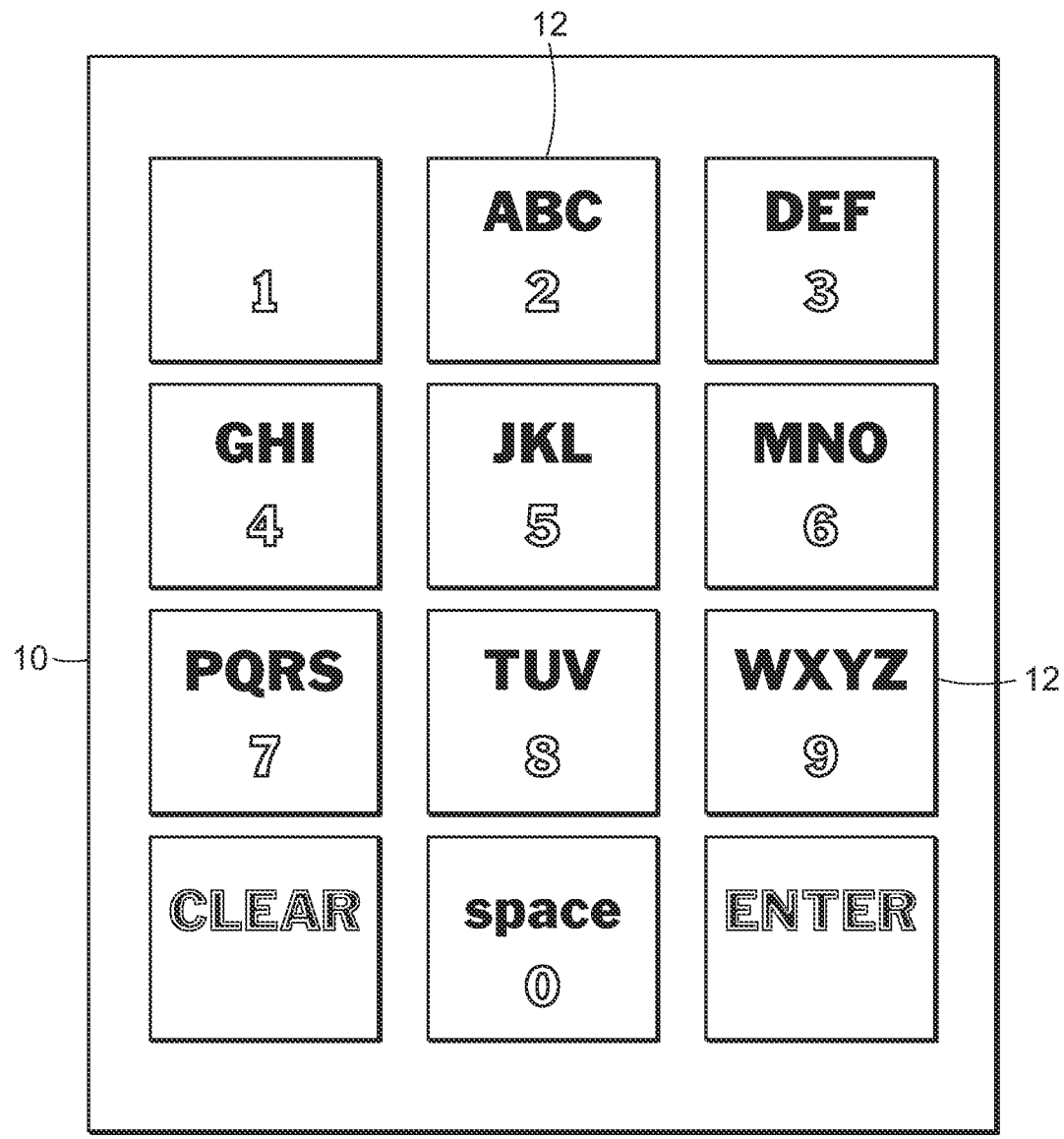
FIG. 1 illustrates a keypad with overloaded keys in accordance with the prior art.

The user types in the multiple term prefix input query by pressing overloaded keys of the text input interface once to form an ambiguous query string. In accordance with one or more embodiments of the invention, the search space is initially indexed by performing a many-to-many mapping from the alphanumeric space of terms to numeric strings corresponding to the various prefixes of each alphanumeric term constituting the query string. In a numeric string, each alphanumeric character in the string is replaced by its corresponding numeric equivalent based on, e.g., the arrangement of characters on the commonly used twelve-key reduced keypad shown in FIG. 1. This mapping scheme enables the system in accordance with one or more embodiments to incrementally retrieve results matching the ambiguous alphanumeric input query, as the user types in each character of the query. The user does not have to explicitly specify the termination of each term to assist the system in disambiguating the input query; instead, the user only enters an input query that includes prefix substrings from multiple terms. The system can leverage off the multiple term prefixes to disambiguate it. The multiple term prefix based disambiguation method in accordance with one or more embodiments of the invention reduces the amount of text and steps needed to enter a multiple term input query and retrieve results.

There are various possible applications for the search techniques described herein including, e.g., assisting television viewers in identifying desired television content items and channels, and assisting users of mobile devices such as cell phones and PDAs in performing searches for items in various databases (e.g., performing searches in directories of people or businesses, and searching for and purchasing products/services like airline tickets).

In the context of television systems, the term "television content items" can include a wide variety of video/audio content including, but not limited to, television shows, movies, music videos, or any other identifiable content that can be selected by a television viewer. Searching for television content items can be performed across disparate content sources including, but not limited to, broadcast television, VOD, IPTV, and PVR (local and network).

Figure 2:
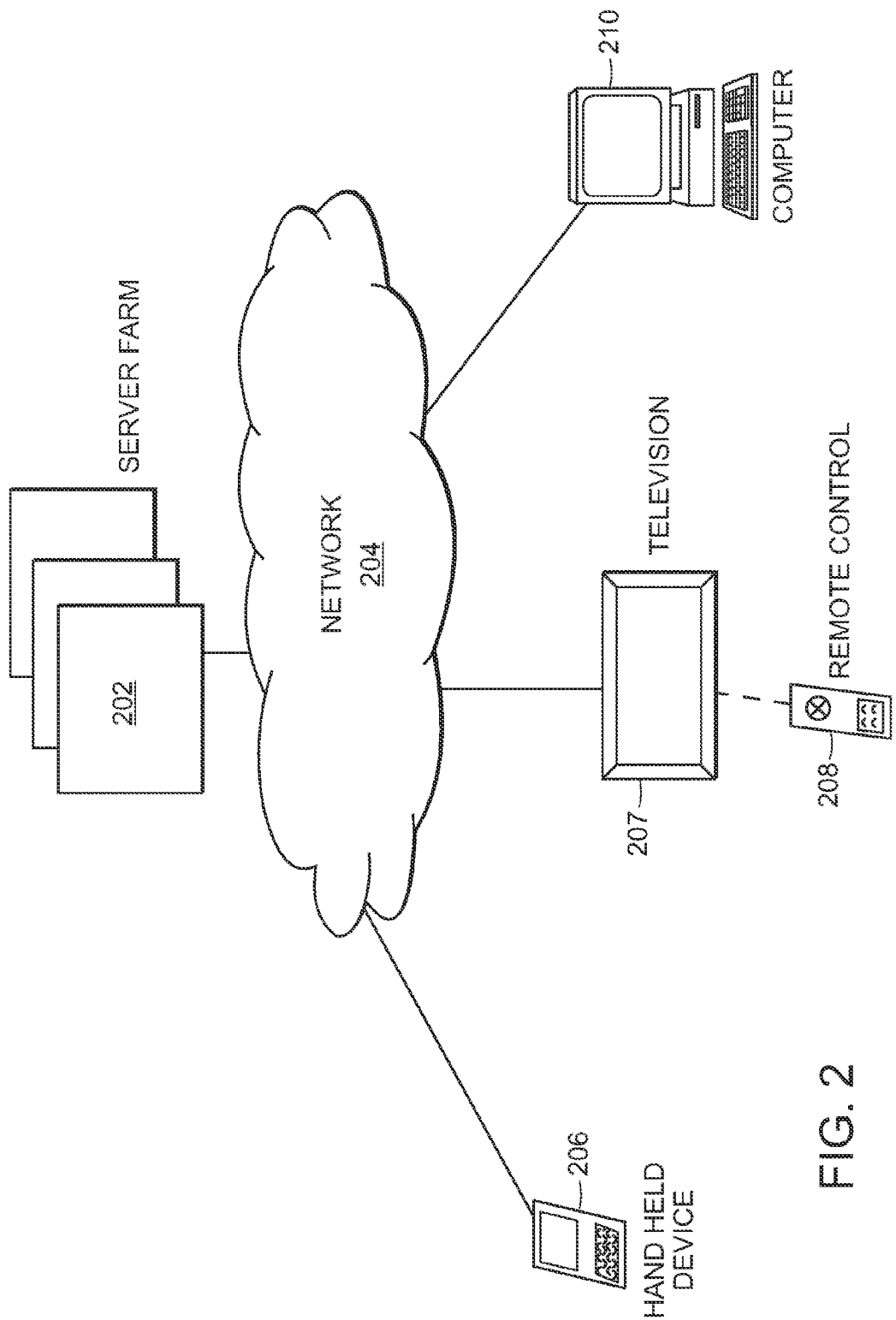
FIG. 2 illustrates a search system in accordance with one or more embodiments of the invention.

FIG. 2 schematically illustrates an overall system for performing searches with reduced text entry using various devices in accordance with one or more embodiments of the invention. The system includes a server farm or system 202, a network 204, and a variety of devices 206, 208, 210 operated by users with text input interfaces. In accordance with one or more embodiments of the invention, the server 202 processes search queries received from the user devices 206, 208, 210. In other embodiments, the search queries are processed on the devices themselves. As discussed below, the server 202 can be the source of search data and relevance updates. If part of a television system, the server 202 can also be the source of or be linked to a source of at least some of the available television content (e.g., a cable or satellite television operator).

The network 204 functions as the distribution framework for transmitting data from the server 202 to the devices operated by the users. The distribution network 204 could be wired or wireless connections or some combination thereof. Examples of possible networks include computer networks, cable television networks, satellite television networks, IP-based television networks, and mobile communications networks (such as, e.g., wireless CDMA and GSM networks).

The search devices could have a wide range of interface capabilities. A device, e.g., could be a hand-held mobile communications device 206 such as a phone or PDA having a limited display size and a reduced keypad with overloaded keys. Another type of search device is a television system 207 with a remote control device 208 having an overloaded keypad. Another possible search device is a Personal Computer (PC) 210 with a full or reduced keyboard and a computer display.

Figure 3:
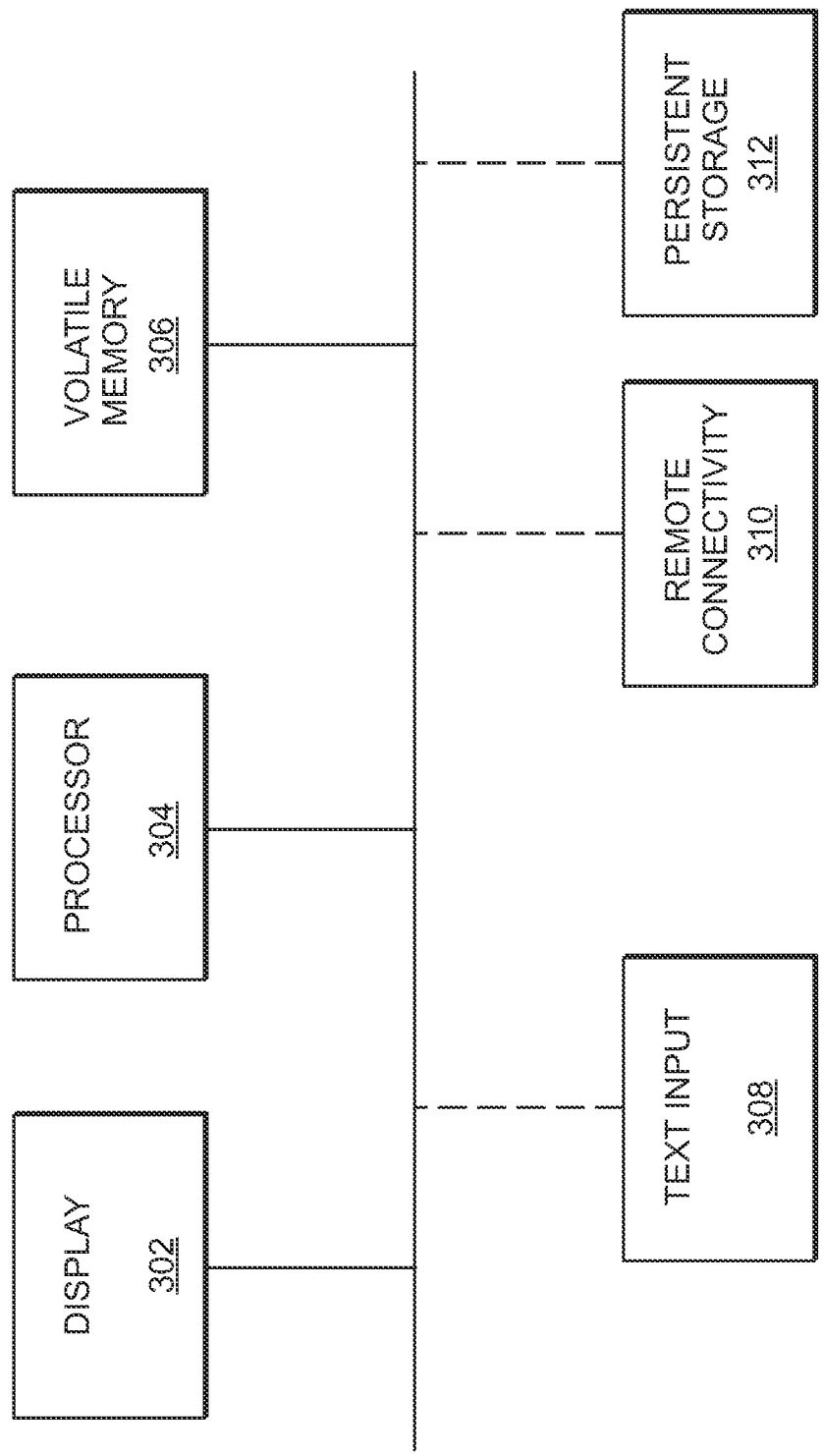
FIG. 3 illustrates various device configuration options for a device for performing searches in accordance with one or more embodiments of the invention.

FIG. 3 illustrates multiple exemplary configurations for search devices in accordance with various embodiments of the invention. In one configuration, a search device (e.g., PC 210) can have a display 302, a processor 304, volatile memory 306, text input interface 308, remote connectivity 310 to the server 202 through the network 204, and a persistent storage 312. A device configuration for a device such as the hand-held device 206 might not include local persistent storage 312. In this case, the device 206 could have remote connectivity 310 to submit the query to the server 202 and retrieve results from it. Another configuration of the devices 206, 208, 210 may not have remote connectivity 310. In this case, the search database may be locally resident on a local persistent storage 312. The persistent storage 312 may be, e.g., a removable storage element such as SD, SmartMedia, CompactFlash card etc. In a configuration of the device with remote connectivity 310 and persistent storage 312 for performing searches (e.g., a television system 207), the device may use the remote connectivity for search relevance data update or for the case where the search database is distributed on the local storage 312 and on the server 202. A preferred configuration in a memory constrained device is the search data residing remotely on a server. Unlike composition applications where the "most frequently used or popular terms space" are small in size and can be maintained in a local vocabulary, search spaces are typically larger inherently because people instinctively use "unique word signatures" to recall a document of interest. Hence maintaining search spaces locally may not be practical in many devices that have insufficient local memory, making a network based search configuration preferable.

In one exemplary embodiment, a television system 207 may have a set-top box or other device with a one-way link to a satellite network. In this configuration, all search data including relevance updates may be downloaded to the device through a satellite link to perform local searching. In this case, the set-top box preferably has sufficient storage capacity to maintain search spaces locally. Local storage is preferably large in this case to circumvent the deficiency of a one-way link.

Figure 4:
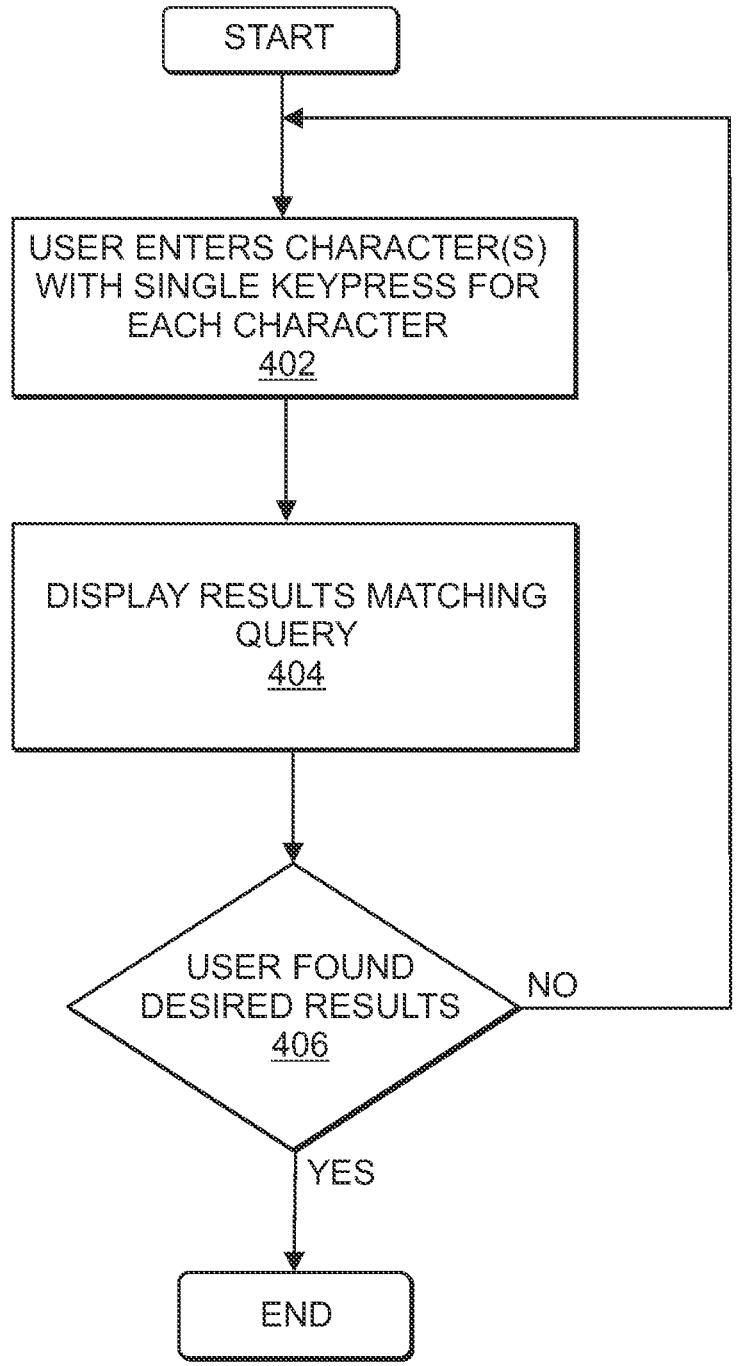
FIG. 4 is a flow chart illustrating a method for finding results with reduced text entry using an overloaded keypad in accordance with one or more embodiments of the invention.

FIG. 4 illustrates a search process in accordance with one or more embodiments of the invention. At step 402, the user enters a character using an ambiguous text input interface, e.g., using a keypad with overloaded keys where a single key press is performed for each character entered. At 404, an incremental search system determines and displays results that match the input character entered at 402. Since the input is ambiguous, the match of results would include the matches for all the ambiguous input characters represented by the single key press. To address this increased set of matches, an ordering scheme is preferably used to order the results to improve accessibility to results expected to be more of interest to the user. The ordering of results can be based on a variety of criteria including, e.g., temporal relevance, location relevance, popularity and personal preferences (that may have been determined implicitly or explicitly) or some combination of these criteria. (In a television application, temporal relevance can be used to favor programs whose timing may be more of interest to the viewer. For example, if the user entered NBA, then the system would list the games in order of temporal relevance such as those in progress or are scheduled to begin in the near future are listed at the higher on the list. The popularity criterion can be used to favor programs or channels that are more popular than others. The personal preference criterion can be used to favor programs or channels that the user has indicated preference for in prior user selections. For example, if a user frequently scrolls down to "CNBC" and selects it, the system would over time place CNBC higher in the list of results over a more generally popular channel such as CNN. Furthermore, identity independent time-based usage pattern learning algorithms can be applied in conjunction with personalization to apply the results ordering rules in an appropriate context. Also, e.g., when using a PDA or cell phone to search for a business, the system may use location relevance as part of the ordering criteria.)

In addition, other ordering schemes can also or instead be used such as, e.g., character count based subspace biasing, examples of which are described in U.S. Patent Application Ser. No. 60/695,463 entitled "Method And System For Incremental Search With Minimal Text Entry On Television Where The Relevance Of Results Is A Dynamically Computed Function Of User Input Search String Character Count" and filed on Jun. 30, 2005, which is assigned to the assignee of the present application and is incorporated by reference herein in its entirety.

The ordering criteria can give preference to the results matching the search query based on a lexical match of the type of query input, e.g., in the following order of preference: single term prefixes, multiple term prefixes, and lastly abbreviation matches.

If the user does not find the desired results at 406, he or she can continue to enter more characters to the search query at step 402. Then at step 404, the system will perform the search based on the cumulative substring of characters of the search query entered by the user up to that point.

Figure 5:
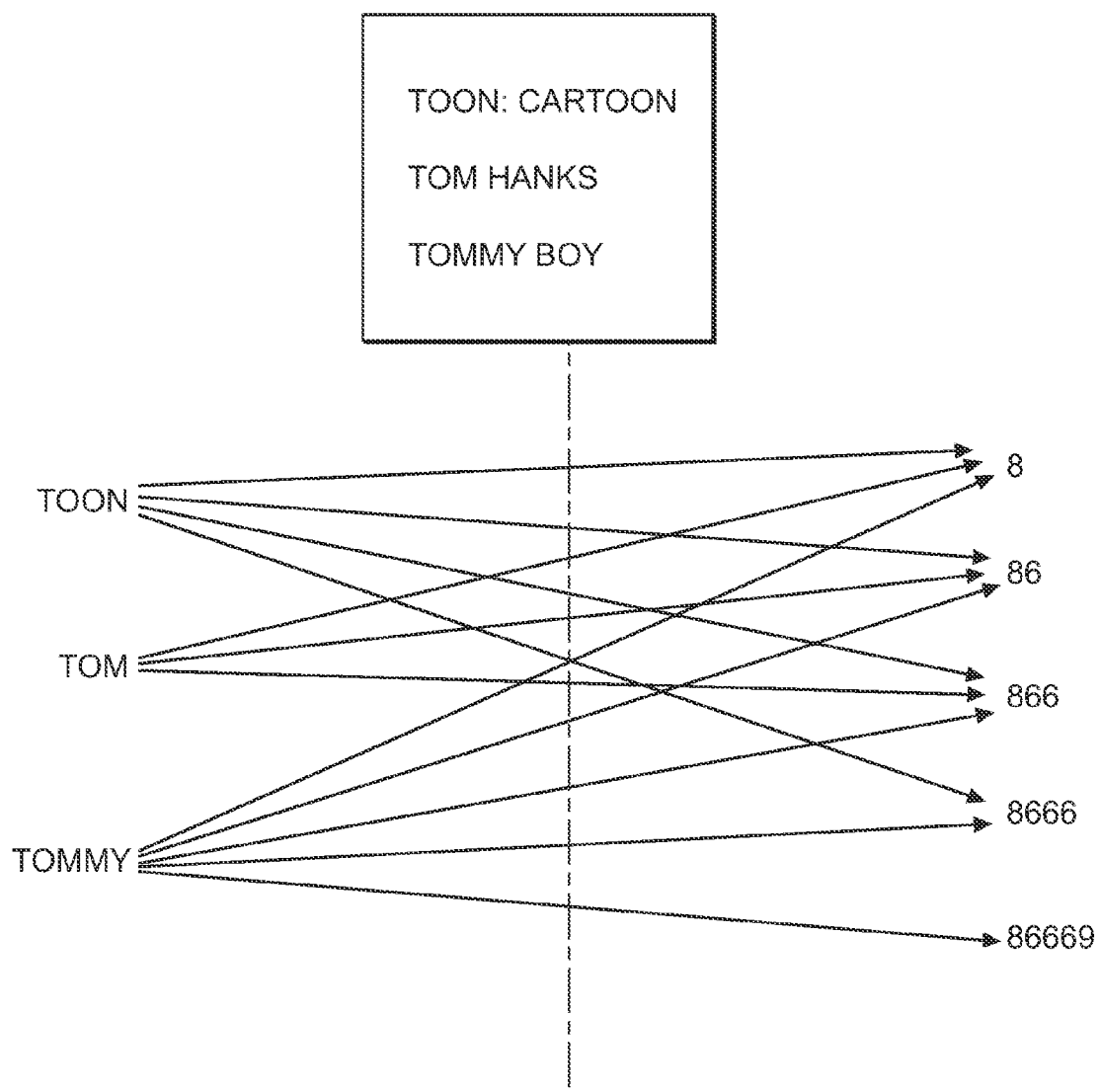
FIG. 5 illustrates a many-to-many mapping of terms to the numeric equivalents.

FIG. 5 illustrates an example of the many-to-many mapping scheme from an alphanumeric terms space to a numeric string space. The exemplary terms "TOON", "TOM", "TOMMY", which can be search terms entered by a television viewer to identify television content, are mapped to the numeric equivalents of their prefix strings: "T"(8), "TO"(86), "TOO"(866), "TOON"(8666), "TOMMY"(86669). This many-to-many mapping scheme enables incremental search processing by enabling even a single character entered by the user to retrieve relevant results. This many-to-many mapping is done during an indexing phase for all terms that can be used to discover a result.

Figure 6:
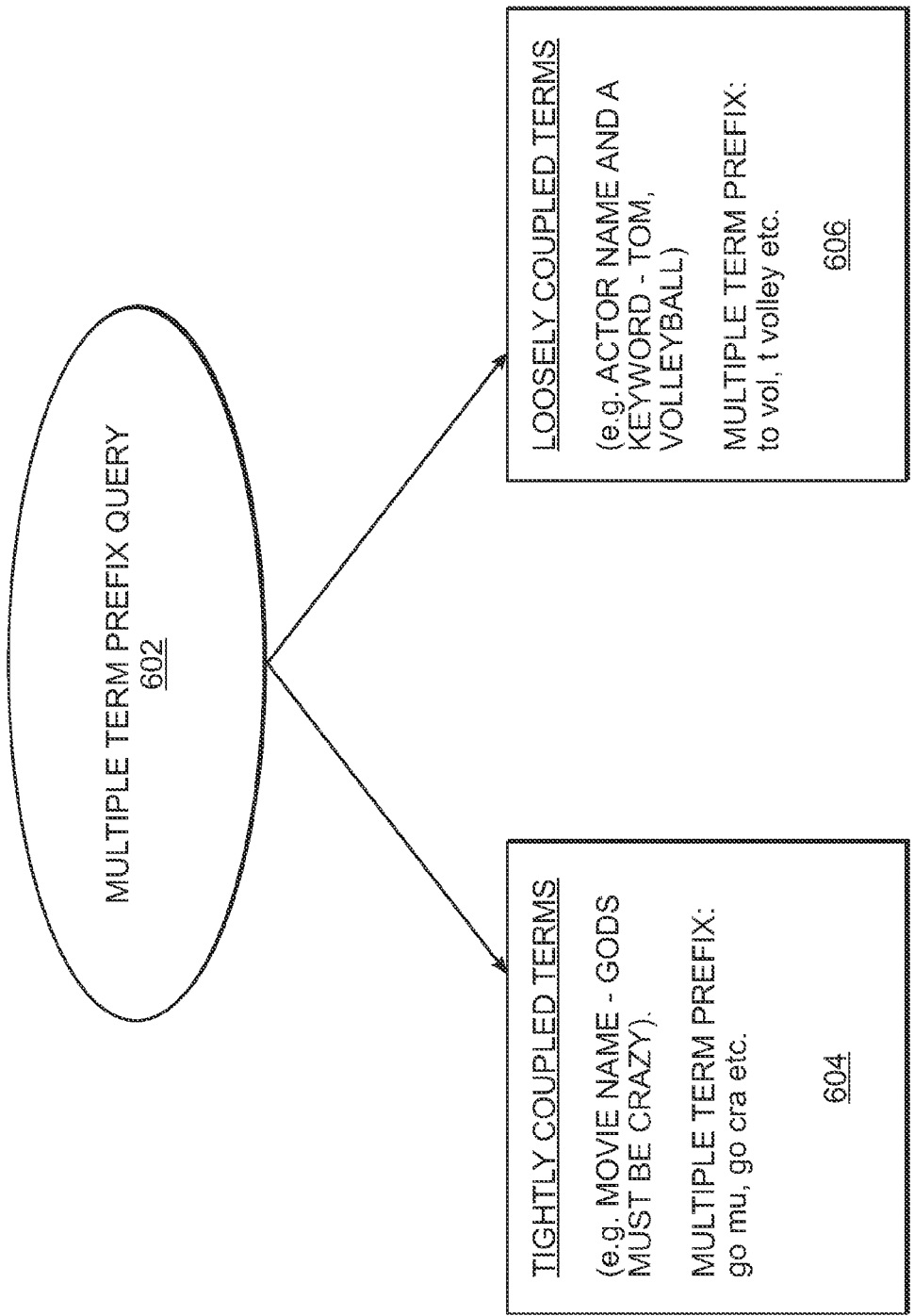
FIG. 6 illustrates the two different couplings between multiple terms in a query.

FIG. 6 illustrates the two broad categories of multiple prefix terms 602 that can be used in search queries. The terms 602 can be tightly coupled terms 604, which are closely related such the terms from movie title or name of a person (e.g., all the terms in the names Gods Must Be Crazy, and Harrison Ford). The terms may be either ordered or unordered (e.g., Ford Harrison or Harrison Ford). Loosely coupled terms 606, on the other hand, are terms that are semantically related, e.g., as in the terms "Tom Volleyball" (Tom Hanks playing a role in a movie cast away with volleyball being a keyword). The prefix based multiple terms input described herein, in addition to being an intuitive mechanism for reduced text input significantly reduces the size of the result space compared to other search techniques in which any query substring could match with results. With these other search techniques, the ambiguity in input could significantly increase the result space size, particularly when the number of characters input is low. This would force the user to enter more characters and diminish the effectiveness of the search process.

Figure 7:
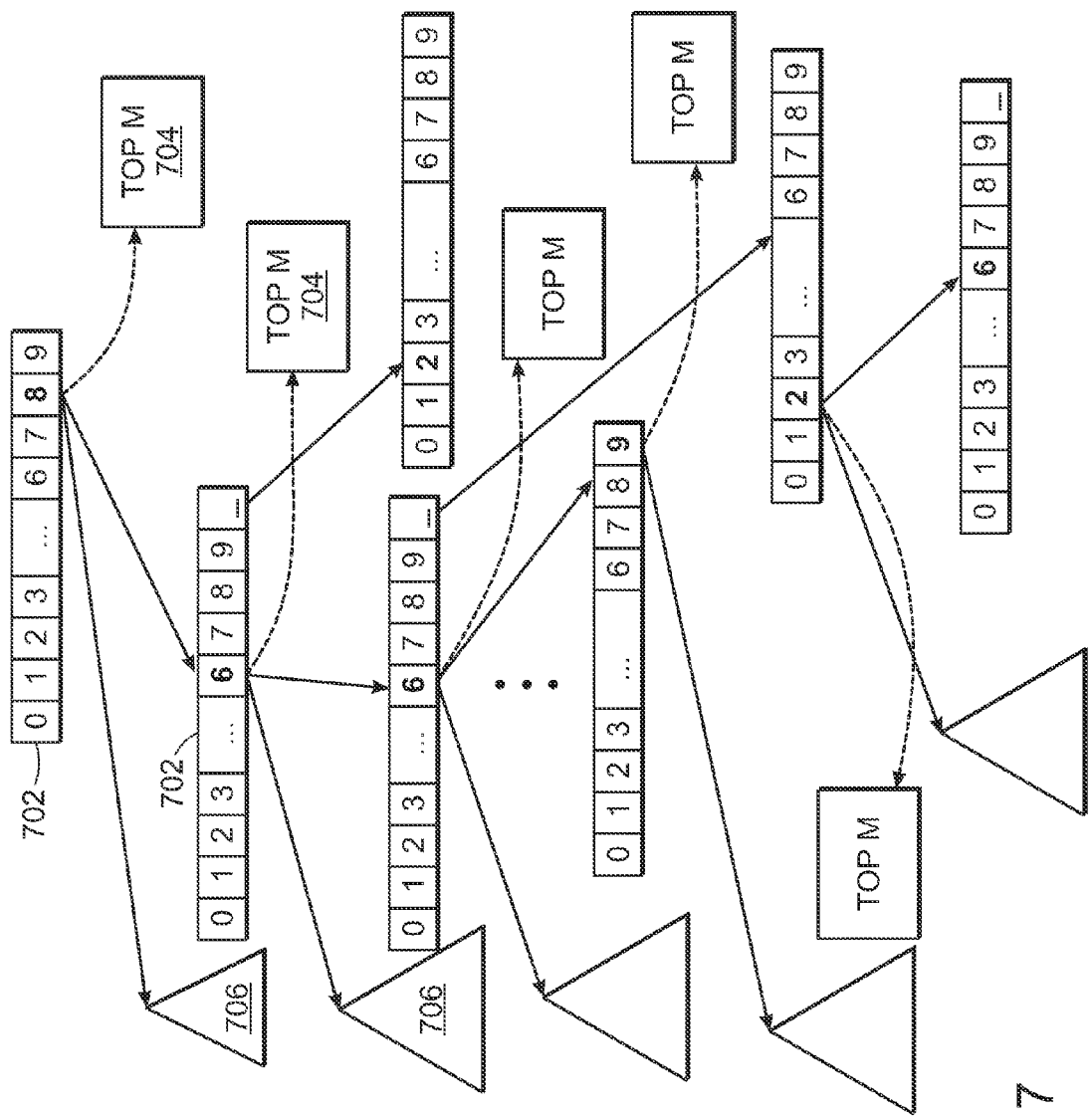
FIG. 7 illustrates a data structure for retrieving results incrementally for each character input using the many-to-many mapping scheme in accordance with one or more embodiments of the invention.

FIG. 7 illustrates a trie data structure that can be used in identifying search results in accordance with one or more embodiments of the invention. Each node 702 of the structure has numerical values from 0-9. Each node has the top M records 704 (determined from some ordering criteria) preferably in "in-memory" storage, which can be a memory that permits quick retrieval. These records are returned immediately to user based on the match string. The illustrated diagram shows the layout of the data structure for the terms "TOMMY BOY". The number of prefix terms and the size of the prefix terms used for pre-computing the trie index are determined by the memory availability and computational capabilities of the system. One example of a trie structure used for incremental searching is described in U.S. patent application Ser. No. 11/136,261 entitled "Method And System For Performing Searches For Television Content Using Reduced Text Input", which is incorporated by reference herein in its entirety. In the FIG. 7 example, the size of the prefix terms used is 2 and the number of terms for pre-computing the trie index is 2. So when the user enters any of the search queries, "8 269"(T BOY), "86 269"(TO BOY), "8 2"(T B), "86 2"(T BO), the results would be retrieved from the top M records 704 if present there. If it is beyond the top M records, the records are retrieved from the secondary storage structure 706 if it is present there. If the results are not found in the secondary structure either, the system can perform an intersection of the top "N" records (N>=M) for the individual terms, in this case, e.g., "T BOY". In preferred embodiments of the invention, the system would return the results obtained both from the trie walk (where results are obtained either from the top "M" records or from the secondary memory) and from the intersection method, where the intersection method would be deployed once the input character count exceeds a given threshold. The multiple prefix terms based search is thus realized in accordance with one or more embodiments of the invention preferably by the combination of a (1) trie walk whose strength and efficiency is highest when input character count is low, and (2) an intersection process whose strength and efficiency is highest when the input character count is above a given threshold.

One characteristic of this method of multiple prefix terms based search in accordance with one or more embodiments of the invention is the absence of an explicit term/word termination action. In other words, the system does not require each word in a search entry to be successively and separately resolved. The system in accordance with one or more embodiments of the invention disambiguates the input by leveraging off the multiple terms (both in the case of loosely coupled and tightly coupled terms).

Figure 8C:
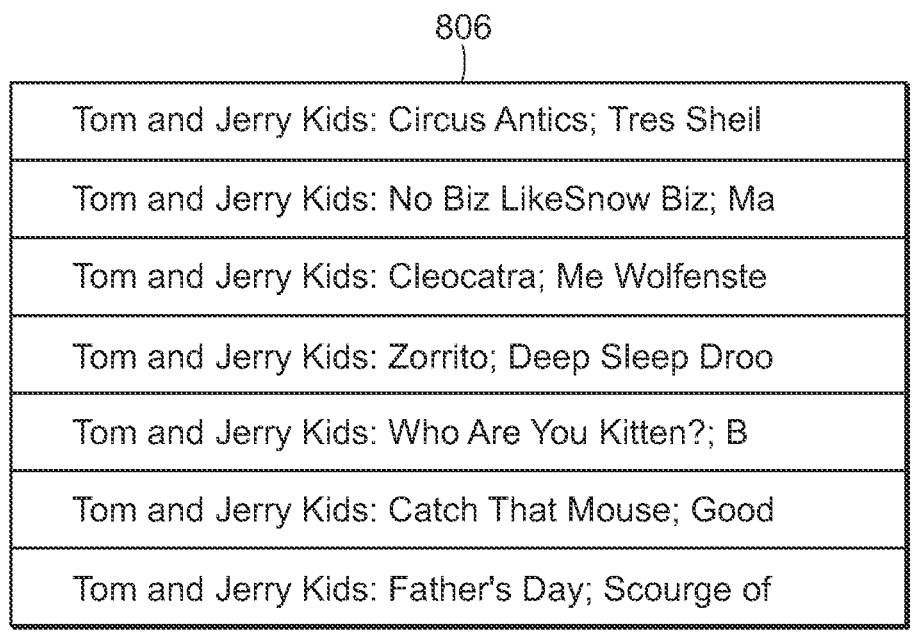

FIGS. 8A-8C illustrate the incremental results obtained for an exemplary search query as characters of the query are input by a user in a television application. In FIG. 8A, the user has input a single character "5" with the intention that the character represent the letter "J". In this example, the user's intent is to find "Tom and Jerry" television programs, and starts with entering "Jerry" in an unordered input. However, there are multiple matches for different terms due to the input ambiguity since the single button pressed represents several characters, in this case results relate to Koala, Lola, Life etc. These terms are ordered in the displayed results list 802, e.g., by the popularity of the matching document and the relevance of the matching term to the document, and displayed on the users' television screen.

As the user has not found the desired content relating to Tom and Jerry, he or she enters additional characters in the search query. As shown in FIG. 8B, the user enters a multiple term text input: "5 86", which is intended to represent the letters "J TO". The results for this query are shown at 804. Because of the input ambiguity ([Koala, Tooth], [Hallie Todd in cast for Lizzie McGuire] etc.), matches for several unrelated programs are retrieved and displayed.

As shown in FIG. 8C, the user then inputs a further character in the search query: "5 866", which is intended to represent "J TOM". With this further character input, the system is able to identify the content of interest, and displays the results in list 806.

Methods of processing ambiguous search query inputs from users in accordance with various embodiments of the invention are preferably implemented in software, and accordingly one of the preferred implementations is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A user-interface method for searching a relatively large set of content items in response to unresolved keystroke entry by a user from a keypad with overloaded keys in which a given key is in fixed association with a plurality of alphabetical and numerical symbols and the entry has relatively few keystrokes so that a subset of targeted content item results is quickly presented, the method comprising:

using an ordering criteria to rank and associate subsets of content items with corresponding strings of one or more unresolved keystrokes for overloaded keys so that the subsets of content items are directly mapped to the corresponding strings of unresolved keystrokes;

subsequent to ranking and associating the content items with strings of unresolved keystrokes, receiving a first unresolved keystroke from a user, wherein one of the plurality of alphabetical and numerical symbols in fixed association with the first unresolved keystroke is a symbol the user is using to search for desired content items;

selecting and presenting the subset of content items that is associated with the first unresolved keystroke based on the direct mapping of unresolved keystrokes to the subsets of content items;

subsequent to receiving the first unresolved keystroke, receiving subsequent unresolved keystrokes from the user and forming a string of unresolved keystrokes including the first unresolved keystroke and the subsequent unresolved keystrokes in the order received; and selecting and presenting the subset of content items that is associated with the string of unresolved keystrokes received based on the direct mapping of unresolved keystrokes to the subsets of content items.

* * * * *